(12) United States Patent
Honda et al.

(10) Patent No.: US 6,643,023 B2
(45) Date of Patent: Nov. 4, 2003

(54) METHOD OF REDUCING POLARIZATION FLUCTUATION INDUCING DRIFT IN RESONATOR FIBER OPTIC GYRO

(75) Inventors: Suminori Honda, Kawasaki (JP); Kazuo Hotate, Chofu (JP)

(73) Assignee: Tokyo Aircraft Instrument Co., Ltd., Tokyo (JP)

( * ) Notice: Subject to any disclaimer, the term of this patent is extended or adjusted under 35 U.S.C. 154(b) by 233 days.

(21) Appl. No.: 09/922,697

(22) Filed: Aug. 7, 2001

(65) Prior Publication Data

US 2002/0051133 A1 May 2, 2002

(30) Foreign Application Priority Data

Aug. 10, 2000 (JP) ........................................ 2000-243218

(51) Int. Cl.$^7$ ............................................... G01L 19/72
(52) U.S. Cl. ......................................................... 356/461

(56) References Cited

U.S. PATENT DOCUMENTS 5,018,857 A * 5/1991 Sanders et al. ............. 356/461
5,237,387 A * 8/1993 Sanders ...................... 356/461

FOREIGN PATENT DOCUMENTS

JP        2000146592 A * 5/2000

* cited by examiner

Primary Examiner—Samuel A. Turner
(74) Attorney, Agent, or Firm—Venable LLP; Norman Kunitz

(57) ABSTRACT

There is provided a method of generating no error in the output of a resonator fiber optic gyro even when the polarization dependency loss is present in a ring resonator of the resonator fiber optic gyro. The relationship between $\Delta L$ and $\Delta \beta$ is set to satisfy the formula $\Delta \beta \Delta L = \pi + 2n\pi$ [radian] (n: integer), or $\Delta \beta \Delta L$ is close to the value obtained from the formula, where $\Delta L$ is defined as the difference between the lengths $L_1$ and $L_2$ of two portions of a waveguide divided by a coupler and a polarization-rotating point in the ring resonator, and $\Delta \beta$ is defined as the difference in propagation constant of two axes of polarization having the waveguide. $\Delta L$ is set so that the error induced by the polarization fluctuation is minimized. Even when the polarization dependency loss is present in the coupler or the like, the ring resonator itself generates no errors thereby, and the error of the gyro output induced by the polarization fluctuation can be minimized in the resonator fiber optic gyro.

5 Claims, 33 Drawing Sheets

(a) Resonance Characteristic of CW Light and CCW Light (b) Calculation Method of Resonance Point $\theta = 90°$

θ = 75°

θ = 45°

$\theta = 10°$ $L = L_1 + L_2$
$\Delta L = L_1 - L_2$ $\Delta \beta \Delta L = \Delta \beta (L_1 - L_2) = \pi + 2n\pi$ (n: Integer)

$L = L_1 + L_2 + L_3$
$\Delta L = L_1 - (L_2 + L_3)$ $\Delta \beta \, \Delta L = \pi + 2n\pi$ (n: integer)
and $\Delta \beta L_3 = m\pi$ (m: integer)

(a) Resonance Characteristic of Reflector Type (b) Resonance Characteristic of Transmitter Type (a) Resonance Characteristic of Reflector Type (b) Resonance Characteristic of Transmitter Type (a) Resonance Characteristic of Reflector Type (b) Resonance Characteristic of Transmitter Type

METHOD OF REDUCING POLARIZATION FLUCTUATION INDUCING DRIFT IN RESONATOR FIBER OPTIC GYRO

BACKGROUND OF THE INVENTION

1. Field of the Invention

The present invention relates to a sensor using a ring resonator, and more particularly, it relates to a method of reducing the polarization fluctuation inducing drift in a resonator fiber optic gyro to measure the differential resonant frequency generated by the rotation between two light waves facing each other propagating in the ring resonator.

2. Description of the Related Art

Fiber optic gyros (FOG: Fiber Optic Gyro) to detect the rotational speed of an object for measurement making use of the Sagnac Effect generated by the rotation include a resonator fiber optic gyro (R-FOG: Resonator Fiber Optic Gyro). The R-FOG can obtain the high sensitivity by the short fiber length making use of the sharp resonance characteristic of the ring resonator.

The ring resonator will be described below.

The R-FOG uses a reflector ring resonator or a transmitter ring resonator comprising an optical fiber and a coupler as a sensing loop. The reflector ring resonator comprises a sensing loop 33 and a coupler 32 as shown in FIG. 9(a). The resonance characteristic shown in FIG. 10(a) can be obtained when the laser beam is incident from a port 1 and the intensity of the emitted light is observed at a port 2 to acquire the characteristic of the incident light to the frequency. The transmitter ring resonator comprises a sensing loop 36 and two couplers 35 and 37 as shown in FIG. 9(b). The resonance characteristic shown in FIG. 10B can be obtained when the laser beam is incident from the port 1 and the intensity of the emitted light is observed at the port 2. The space of the resonance points is referred to as the free spectrum range, and given as follows:

$$\nu_{FSR} = \frac{c}{nL} \quad (1)$$

where c is the velocity of light, n is the refractive index of the optical fiber, and L is the sensing loop length.

The fineness is the parameter showing the sharpness of the resonance, and defined by the formula (2).

$$F = \frac{\nu_{FSR}}{\Delta \nu} = \frac{\pi \sqrt{\alpha R}}{1 - \alpha R} \quad (2)$$

where $\Delta \nu$ is the full width at half maximum of the resonance characteristic shown in FIG. 10, R is the branching ratio of the coupler, and $\alpha$ is the loss in the ring resonator. Generally speaking, the detection sensitivity as the gyro is increased as the fineness is increased.

The resonance characteristic can also be obtained similarly by setting the X-axis as the phase difference between two light waves different by one trip propagating around the ring resonator as shown in FIG. 11. The space of the resonance points adjacent to each other is just $2\pi$.

The principle of detecting the rotation of the R-FOG is that, when the ring resonator is rotated at the angular velocity $\Omega$, an optical path difference is generated due to Sagnac Effect in the optical path length of the clockwise light wave (CW light) and the counterclockwise light wave (CCW light), and the difference is generated thereby in the resonant frequency of the CW light and the CCW light. The difference in resonant frequency is expressed as follows:

$$\Delta \nu_s = \frac{4S}{\lambda L} \Omega \quad (3)$$

where S is the area surrounded by the ring resonator, and $\lambda$ is the wavelength of the oscillated laser beam. The angular velocity $\Omega$ is obtained by measuring the difference in the resonant frequency.

FIGS. 12 and 13 show the general configuration of the R-FOGs using the reflector ring resonator and the transmitter ring resonator, respectively.

The light emitted from laser beam sources 41 and 49 is branched into two by a beam splitter BS. The two branched lights pass through lenses $L_1$ and $L_2$, respectively, and are guided to the optical fiber, and incident in a coupler C1. The lights incident in ring resonators 46 and 54 by the coupler C1 propagate in the loop clockwise (CW) and counterclockwise (CCW).

The resonance characteristic is observed by a light receiver D1 for the CW light and by a light receiver D2 for the CCW light, respectively. In order to detect the resonance point, both the CW light and the CCW light are bias-modulated by the sinusoidal wave having the frequency $f_n$ and the frequency $f_m$ by phase modulators PM2 and PM1 before the lights are incident in the ring resonators 46 and 54. The frequency $f_n$ and the frequency $f_m$ are generated by oscillators (1) 44 and 53 and oscillators (2) 45 and 52. The differential resonance characteristic can be obtained through the synchronous detection at the frequency of the sinusoidal wave. The resonance point is the frequency of the light wave at which the differential resonance characteristic is zero, and can be detected and traced through the feedback thereto.

In the R-FOG, the reciprocal effect to the CW light and the CCW light is separated from the non-reciprocal effect due to Sagnac Effect.

Generally, for the reciprocal effect, a method for feedback to the frequency of oscillation of the laser beam source based on the output of the light receiver of either the CW light or the CCW light is employed in order to follow the resonance point to be shifted.

The method for bias modulation to detect the resonance point is possible by implementing the binary frequency shift by the "digital serrodyne" at a predetermined switching frequency as introduced in Kazuo Hotate and Michiko Harumoto, "RESONATOR FIBER OPTIC GYRO USING DIGITAL SERRODYNE MODULATION", IEEE J. Lightwave Technol., Vol. 15, No. 3, pp. 466–473, 1997 (Literature 1).

In FIGS. 12 and 13, the CW light and the CCW light are synchronously detected by a synchronous detection circuit LIA1 and a synchronous detection circuit LIA2, respectively, and the deviation in the resonant frequency can be detected. The output of the synchronous detection circuit LIA1 is inputted in laser frequency control circuits 39 and 47, and control device so that the laser beam frequency $f_0$ agrees with one resonance point with reference to the CW light. The output of the synchronous detection circuit LIA2 is obtained from the deviation in the resonance point between the CW light and the CCW light as the voltage value. This is the open loop output of the gyro.

In order to expand the range of detection, a closed loop system using the serrodyne (sawtooth) wave is used. The serrodyne wave works to change the frequency of the light wave by the frequency of the serrodyne wave with the amplitude thereof as the voltage value to give the phase rotation of $2\pi$. An electro-optic modulator formed on a lithium niobate ($LiNbO_3$:LN) waveguide is extensive in frequency range, and used in modulation by the serrodyne wave.

The output of the synchronous detection circuit LIA2 is inputted in integrators 43 and 51 for integration control, and the output of the integrators is inputted in a voltage control oscillator VCO to change the frequency $f_2$ of the serrodyne wave generated by a serrodyne wave generator. The serrodyne wave is inputted in a waveguide type phase modulator LN2, and controlled so that the CCW light agrees with the resonance point. The frequency of the CCW light becomes $f_0+f_2$. The closed loop output of the gyro can be obtained by counting the frequency $f_2$ of the serrodyne wave.

In order to further improve the resolution, the serrodyne wave having a fixed frequency $f_1$ is inputted in the CW light using a waveguide type phase modulator LN1 simultaneously with the input of the serrodyne wave in the CCW light. The frequency of the CW light in this condition becomes $f_0+f_1$. As a result, the difference in the frequency $f_2-f_1$ between the CCW light and the CW light becomes the closed loop output of the gyro.

Polarization fluctuation which is one of the error factors of the R-FOG will be described below.

The polarization fluctuation means the change of the polarization condition of the light wave by the unevenness of the waveguide or the polarization dependency, and is considerably affected by the environmental conditions including the temperature or the like.

Thus, a polarization maintaining fiber (PMF: Polarization Maintaining Fiber) is generally used. The polarization maintaining fiber has two axes of polarization along which the linearly polarized wave can be propagated.

However, even when the polarization maintaining fiber is used, it is practically impossible to selectively use one axis of polarization due to the crosstalk of the optical fiber (the waveguide) and the coupler, and the assembly errors in manufacturing the ring resonator, and the resonance characteristic of the ring resonator has the characteristic of superposing two eigenstates of polarization (ESOP: Eigenstate of Polarization). The Eigenstate of Polarization (ESOP) means the polarization condition that the light wave is not changed when the light wave makes one trip around the ring resonator, and corresponds to two eigenvectors of the transfer matrix expressing one trip of the ring resonator.

Next, the condition that two ESOPs affect the gyro output will be described below.

More correctly, in the ring resonator shown in FIG. 9, at least one splice (fusion) point is required in the sensing loop as shown in FIG. 14. The fusion angle $\theta$ must be adjusted here so that the axes of polarization of fibers for fusion must agree with each other; however, the rotation of the axes of polarization is generated due to the angular deviation. In addition, the crosstalk at the sensing loop and the polarization coupling at the coupler or the lead part are generated. Thus, even when the laser beam of the linearly polarized wave is incident only on X-axis, the light wave is actually coupled with Y-axis in an unwanted manner, appearing an aspect different from an ideal one.

In the resonance characteristic observed by the light receiver, the resonance points corresponding to two ESOPs appear as shown in FIG. 15. When ESOP having the resonance point used to detect the rotation is defined as ESOP1, ESOP2 has an unwanted resonance point. The positional relationship of the resonance points of ESOP1 and ESOP2 is dependent on the length of the resonator, i.e., the length of the sensing loop, and fluctuated according to the environmental temperature, etc. The resonance point of ESOP2 is increased as the distance from ESOP1 is decreased. FIG. 15 shows this condition in a part expressed by chain lines.

Approach of the resonance point of ESOP2 to the resonance point of ESOP1, and duplication thereof lead to a very large error factor of the gyro output, which is quantitatively verified in K. Takiguchi and K. Hotate, "BIAS OF AN OPTICAL PASSIVE RING-RESONATOR GYRO CAUSED BY THE MISALIGNMENT OF THE POLARIZATION AXIS IN THE POLARIZATION-MAINTAINING FIBER RESONATOR", IEEE J. Lightwave Technol., Vol. 10, No. 4, pp. 514–522, 1992 (Literature 2). According to the literature, the resonance points of two ESOPs are duplicated when $\Delta\beta L$ which is the product of the difference $\Delta\beta$ in the propagation constant of two axes of polarization of the polarization maintaining fiber used in the ring resonator and the length L of the sensing loop fiber is $\Delta\beta L = 2m\pi$ (m: integer), and the resonance points of two ESOPs are separated most from each other when $\Delta\beta L = \pi + 2m\pi$ (m: integer), and the unwanted resonance points of ESOP2 can be minimized.

However, $\Delta\beta L$ is changed by at least $\pi$ in the temperature change of about 1° C., and in reality, duplication of the resonance points cannot be avoided. In order to solve this problem, the fusion is implemented with the axes of polarization of the polarization maintaining fiber twisted by 90° at the splice point in the ring resonator as shown in FIG. 16 ($\theta=90°$), and this method has been disclosed in U.S. Pat. No. 5,018,857, Sanders et al., "PASSIVE RESONATOR GYRO WITH POLARIZATION ROTATING RING PATH" (Literature 3) and Sanders et al., "NOVEL POLARIZATION-ROTATING FIBER RESONATOR FOR ROTATION SENSING APPLICATIONS", Proc. SPIE, Fiber Optic and Laser Sensors VII., Vol. 1169, pp. 373–381, 1989 (Literature 4).

The rotation of 90° of the polarized wave in the ring resonator equally excites two ESOPs as shown in FIG. 17, and since the resonance point of one ESOP is located at the center of the other resonance point which repeatedly appears, and the resonance points of the two ESOPs do not duplicate even when the length of the resonator is changed.

In addition, if the angular deviation at the 90° splice point is 1° ($\theta=89°$ or $\theta=91°$), and the fineness of the resonator is not less than 100, it has been analyzed that the error is not more than $10^{-7}$ (radian/s) which is the accuracy required for the inertial navigation of an aircraft in K. Takiguchi and K. Hotate, "EVALUATION OF THE OUTPUT ERROR IN AN OPTICAL PASSIVE RING-RESONATOR", IEEE Photon. Technol., Vol. 3, No. 1, pp. 80–90, 1991 (Literature 5). However, it is assumed in this analysis that no polarization dependency is present in the ring resonator.

However, the experimental result that the polarization dependency which has been assumed to be absent works as a large error factor, and the performance expected from the theoretical analysis cannot be achieved, is demonstrated in L. K. Strandjord and G. A. Sanders, "RESONATOR FIBER OPTIC GYRO EMPLOYING A PORARIZATION-ROTATING RESONATOR", Proc. SPIE, Vol. 1585, Fiber Optic Gyros: 15th Anniversary Conference, 1991 (Literature 6).

In order to clarify the problems, the analysis shown in Literature 5 will be described. This analytical method is theoretically developed in detail by Literature 2, and the models used in the analysis are substantially equivalent to each other. The main difference is that the angle $\theta$ at the splice point is set to be $\theta \approx 0°$ in the latter analysis, while $\theta$ is set to be $\theta \approx 90°$ in the former analysis.

FIG. 18 shows a model of the ring resonator used in these analyses. $P_1$ and $P_2$ are polarizers connected to the lead part of the ring resonator. However, in the analysis of the 90° splice (Literature 5), no polarizer is inserted in the lead part of the ring resonator. The coupler is assumed to be free from any polarization dependency in both analyses. $E_{0CW}$ and $E_{0CCW}$ in FIG. 18 are the laser beam incident in the ring resonator, where the incident light is assumed to be the linearly polarized wave, and $\theta_{iCW}$ and $\theta_{iCCW}$ express the angular deviation to the axes of polarization of the fiber. L means the length of the fiber of the sensing loop, and $L_1$ and $L_2$ mean the lengths of two portions divided from the coupler 55 at the splice point. $\Delta L$ is the difference therebetween.

According to Literature 2, the power, i.e., the resonance characteristic of one light to be observed by the light receiver is summarized in the following form:

$$|E_{dCW}/E_{0CW}|^2 = K_1|U_1|^2 + K_2|U_2|^2 + K_3 \quad (4)$$

where $$|U_j|^2 = K_4\left[1 - \frac{K_5}{\left(1 - K_6^{1/2}\right)^2 + 4K_6^{1/2}\sin^2(\beta_j L/2)}\right]$$

The resonance characteristic for the CCW light is similar thereto.

In the formula, $K_i$ (i=1 to 6) is the constant determined by the parameters of the ring resonator, and $\beta_j$ (j=1, 2) is the propagation constant of each ESOP. First, second and third terms in the formula (4) mean the interference components expressed by ESOP1, ESOP2 and the product thereof. The third term is generated only when the factor of the polarization dependency is present in the ring resonator and in the lead part to the light receiver.

The differential resonance characteristic obtained by differentiating the formula (4) is required to detect the resonance point.

The differential resonance characteristic is controlled to be zero by the closed loop system. The resonance point of ESOP1 is used here to detect the rotation. The differential resonance characteristic is decomposed into three components corresponding to ESOP1, ESOP2 and the interference component as shown in FIG. 19, and the operation point of the resonance point of ESOP1, i.e., the position at which the differential resonance characteristic is zero is deviated from $\xi = 2q\pi$ (q:integer) due to the presence of ESOP2 and the interference component. In order to calculate the operation point, the formula (4) is differentiated by the phase corresponding to each term to obtain $\xi$ to satisfy the formula (5).

$$D_1(\xi) + D_2(\xi - \Delta\beta') + D_3(\xi, \xi - \Delta\beta') = 0 \quad (5)$$

$D_i$ (i=1 to 3) expresses the differentiation by $\xi$ of the i-th term in the formula (4), and $\Delta\beta'$ is the difference in the propagation constant between two ESOPs. With N as an integer, the deviation from $\xi = 2q\pi$ (q:integer) converted in the angular velocity is expressed as follows:

$$\Delta\Omega = \frac{c_0\lambda}{4\pi Lr}(\xi - 2N\pi) \quad (6)$$

where $c_0$, $\lambda$ and r are the velocity of light in vacuum, the wavelength of the light source, and the radius of the ring resonator, respectively.

Since the difference at each operation point of the CW light and the CCW light is used for the output to detect the rotation, the operations of the formulae (4) to (6) are implemented for the CW light and the CCW light, respectively, and the difference is defined as the error of the gyro output.

As described above, in the analysis of the 90° splice, no polarizer is inserted in the lead part of the ring resonator.

The transfer matrix of the polarizer is expressed as follows:

$$P_1 = \begin{pmatrix} 1 & 0 \\ 0 & \varepsilon_i \end{pmatrix} (i = 1, 2) \quad (7)$$

The polarization dependency loss is similarly expressed.

Thus, $\varepsilon_1 = \varepsilon_2 = 1$, and the third term in the formula (4) is not generated. Thus, the calculated error is affected only by ESOP2.

However, it is impossible that the polarization dependency loss is completely not present. The effect can be checked by substituting the numerical value such as 0.9999 which is slightly changed from 1 into $\varepsilon_i$ (i=1, 2).

FIG. 20 shows the errors of the gyro output calculated by substituting 1, 0.9999, 0.999 and 0.99 in $\varepsilon_1$.

It is understood from FIG. 20 that the errors of the gyro output are rapidly increased by the slight change in $\varepsilon_1$. It is thus understood that the calculated error with $\varepsilon_i = 1$ for a condition in which no polarizer is used, i.e., the accuracy of the gyro cannot be expected in practice.

Separate from the present invention, the countermeasures have been tried for the above problems, and disclosed in U.S. Pat. No. 5,296,912, Strandjord et al., "R-FOG ROTATION RATE ERROR REDUCER HAVING RESONATOR MODE SYMMETRIZATION" (Literature 7) and L. K. Strandjord and G. A. Sanders, "PERFORMANCE IMPROVEMENTS OF A POLARIZATION-ROTATING RESONATOR FIBER OPTIC GYROSCOPE", Proc. SPIE, Fiber Optic and Laser Sensors X, Vol. 1795, pp. 94–104, 1992 (Literature 8).

In the countermeasures, the error can be reduced if the frequency is switched to allow the frequency of oscillation of the light source to alternately follow ESOP1 and ESOP2, and the output generated in each case is averaged by using the different sign of the error when ESOP1 is used for detecting the rotation, and when ESOP2 is used for detecting the rotation.

In addition, the countermeasures that the output of the ring resonator observed by the light receiver has no errors is disclosed in L. Strandjord and G. Sanders, "PASSIVE STABILIZATION OF TEMPERATURE DEPENDENT POLARIZATION ERRORS OF A POLARIZATION-ROTATING RESONATOR FIBER OPTIC GYROSCOPE", Proc. SPIE, Fiber Optic and Laser Sensors XIII, Vol. 2510, pp. 81–91, 1995 (Literature 9). The countermeasures were verified for the transmitter ring resonator.

In this countermeasures, the error is reduced if the difference between the length $L_1$ from the first coupler to the 90° splice point and the length $L_2$ from the second coupler and the 90° splice point is zero, and the length $L_3$ between the first coupler and the second coupler is close to zero, where $L_1$, $L_2$ and $L_3$ are the lengths of three portions of the optical fiber divided by the first coupler in which the light wave emitted from the laser beam source first reaches, the 90° splice point in the ring resonator, and the second coupler to emit the light wave and input the light wave in the light receiver, respectively.

However, in the theoretical development leading to the result, a large number of approximations are used, and a focus is placed in the space between the resonance point of ESOP1 and the resonance point of ESOP2, i.e., in that one resonance point is located in the center of the other repeatedly appearing resonance point; however, the mechanism of generation of the error appearing in the gyro output is not analyzed.

SUMMARY OF THE INVENTION

The present invention has been made to solve various problems described above, and an object of the present invention is therefore to provide a method of eliminating the error generated in the output of a resonator fiber optic gyro even when the loss in the polarization dependency which has never been solved in conventional methods is present in a ring resonator.

A method of reducing the polarization fluctuation inducing drift in a resonator fiber optic gyro includes the step of setting $\Delta L$ so that the relationship of $\Delta L$ and $\Delta\beta$ satisfies a formula $\Delta\beta\Delta L=\pi+2n\pi$ [radian] (n: integer), or approximately satisfies the formula to minimize the error induced by the polarization fluctuation where $\Delta L$ is the difference in length between $L_1$ and $L_2$ of two portions of a waveguide divided by a coupler and the polarization-rotating point, and $\Delta\beta$ is the difference in propagation constant of two axes of polarization of the waveguide in a method of measuring the non-reciprocal effect such as the rotation in a reflector ring resonator comprising a sensing loop formed of the waveguide having two axes of polarization to propagate the light wave, and the coupler which is inserted in said sensing loop, guides the light wave from a laser beam source to said sensing loop and emits the light wave in said sensing loop, and having a polarization-rotating point in said sensing loop.

The method of reducing the polarization fluctuation inducing drift in a resonator fiber optic gyro includes the step of setting $\Delta L$ and $L_3$ so that the relationship of $\Delta L$, $\Delta\beta$ and $L_3$ satisfies a formula $\Delta\beta\Delta L=\pi+2n\pi$ [radian] (n: integer) and $\Delta\beta L_3=m\,\pi$ [radian] (m: integer), or approximately satisfies the formulae to minimize the error induced by the polarization fluctuation where $L_1$ is the distance from said first coupler to the polarization-rotating point, $L_2$ is the distance from the polarization-rotating point to said second coupler, $L_3$ is the distance from said second coupler to said first coupler, $\Delta L$ is the difference between $L_1$ and the length $(L_2+L_3)$ from the polarization-rotating point to said first coupler through said second coupler, and $\Delta\beta$ is the difference in propagation constant of two axes of polarization of the waveguide when the waveguide is divided into three portions by said first coupler, said polarization-rotating point and said second coupler in a method of measuring the non-reciprocal effect such as the rotation in a transmitter ring resonator comprising a sensing loop formed of the waveguide having two axes of polarization to propagate the light wave, a first coupler to guide the light wave from a laser beam source to said sensing loop and a second coupler to emit the light wave in said sensing loop which are inserted in said sensing loop, and having a polarization-rotating point in said sensing loop.

In the present invention, the polarization-rotating angle at the polarization-rotating point can be set to be about 90° in the above configuration.

The method of reducing the polarization fluctuation inducing drift in a resonator fiber optic gyro includes the step of minimizing the error irrespective of any change in $\Delta\beta L$ by controlling $\Delta L$ making use of the fact that the characteristic of said measurement error is considerably dependent on the product of $\Delta\beta$ and $\Delta L$ where $\Delta L$ is the difference in length of two portions of a waveguide divided by said first coupler and said polarization-rotating point, and $\Delta\beta$ is the difference in propagation constant of two axes of polarization of the waveguide, and less dependent on $\Delta\beta L$ which is the product of the sum of the length of two portions of the waveguide (L) and $\Delta\beta$ which is the sum in propagation constant of two axes of polarization of the waveguide in a method of measuring the non-reciprocal effect such as the rotation in a reflector ring resonator or a transmitter ring resonator comprising a sensing loop formed of the waveguide having two axes of polarization to propagate the light wave and a coupler inserted in said sensing loop, and having a polarization-rotating point in said sensing loop.

In the present invention, the error is minimized irrespective of any change in $\Delta\beta L$ through the feedback to the difference $\Delta L$ in length between two portions of a waveguide divided by a coupler in which the light wave emitted from a laser beam source reaches first and the polarization-rotating point in a ring resonator making use of generation of an error signal indicating the deviation from an optimum value of $\Delta\beta\Delta L$ at a predetermined period by alternately applying two different depths of modulation in the bias modulation implemented for detecting a resonance point at the predetermined period.

In the above configuration, the ring resonator itself can be set in a condition in which no errors are generated even when the polarization dependency loss is present in the ring resonator. Thus, the resonator fiber optic gyro using this method can suppress the errors of the gyro output induced by the polarization fluctuation to a minimum, and reduce the drift of the gyro output caused by the change in the errors. The gyro high in accuracy can thus be realized.

DESCRIPTION OF THE PREFERRED EMBODIMENTS

Figure 1:
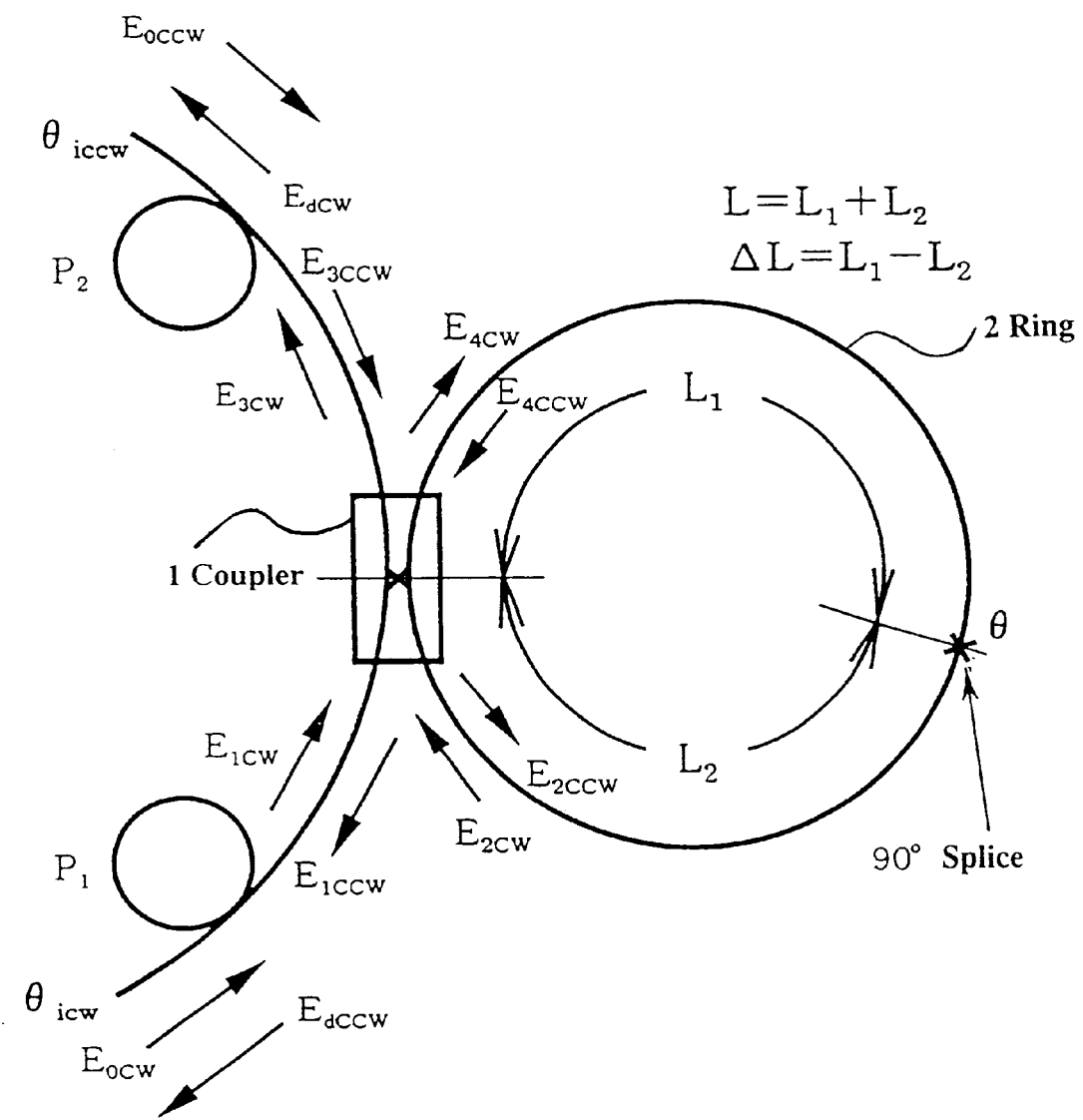
FIG. 1 is a schematic representation for explaining a first embodiment of a resonator fiber optic gyro in accordance with the present invention, and an overall view of a reflector ring resonator model.

The preferred embodiments of the present invention will be described in detail with reference to the drawings.

In order to find out a method of analyzing the errors generated in measuring the non-reciprocal effect such as the rotation to prevent the errors in a ring resonator comprising a wave guide to propagate the light wave and a coupler, it is necessary to consider the presence of the polarization dependency loss in a lead part from the ring resonator to a light receiver.

In the present invention, a method of minimizing the errors is found out by assuming the polarization dependency loss to each component of the ring resonator to obtain the resonance characteristic of the CW light and CCW light, calculating the deviation (the operation point) of the resonance point of each ESOP1, and analyzing the mechanism of generation of the errors appearing in the gyro output by the difference therebetween.

Most important parameters in the analysis of the present invention include $\Delta\beta L$ and $\Delta\beta\Delta L$ to indicate that the sensing loop length of the ring resonator is expandable by the change in the environmental temperature. $\Delta\beta$ is the differential propagation constant of two polarization axes of the polarization maintaining fiber, and L and $\Delta L$ are the sum and the difference of the lengths $L_1$ and $L_2$ of two portions of the wave guide to be split at the splice position in the coupler at which the light wave emitted from the laser beam source arrives first and the ring resonator.

The present invention verifies how both $\Delta\beta L$ and $\Delta\beta\Delta L$ are involved in generation of the errors in order to clarify the generation mechanism of the errors. Both $\Delta\beta\Delta L$ and $\Delta\beta L$ have the periodicity of $2\pi$, and the total image of the error generation can be grasped if the errors are calculated from 0 to $2\pi$. Since the effect by $\Delta\beta L$ appears symmetric with respect to $\pi$, $\Delta\beta L$ is set to be between 0 and $\pi$ in the analysis of the present invention.

In every analysis for the present invention, the parameters are set to the following values: Sensing loop length=15 m, sensing loop diameter r=0.05 m, wavelength λ of laser beam source=1.3 μm, splice angle θ in the ring resonator=89°, angular deviations with respect to fiber polarization axes of the incident linearly polarized wave $\theta_{iCW}=1°$ and $\theta_{iCCW}=2°$.

Other parameters used in the analysis of the present invention are as follows:

Splice angle in ring resonator: θ [°]

Polarization dependency loss (reflector) at lead part: $\epsilon_i$ (i=1–2)

Polarization dependency loss (transmitter) at lead part: $\epsilon_i$ (i=1–4)

Coupling ratio at coupler (reflector): $\kappa_x$, $\kappa_y$

Loss at coupler (reflector): $\gamma_x$, $\gamma_y$

Crosstalk at coupler (reflector): $\theta_R[°]$
Coupling ratio at input side coupler (transmitter): $\kappa_{1x}, \kappa_{1y}$
Coupling ratio at output side coupler (transmitter): $\kappa_{2x}, \kappa_{2y}$
Loss at input side coupler (transmitter): $\gamma_{1x}, \gamma_{1y}$
Loss at output side coupler (transmitter): $\gamma_{2x}, \gamma_{2y}$
Crosstalk at input side coupler (transmitter): $\theta_{R1}[°]$
Crosstalk at output side coupler (transmitter): $\theta_{R2}[°]$
(Reflector Ring Resonator)

The analysis of the errors when using the reflector ring resonator for the resonator fiber optic gyro with the method in accordance with the present invention applied thereto will be described below.

FIG. 1 shows the model of the reflector ring resonator used in the analysis of the present invention.

The coupler is assumed to have the polarization dependency, and the reflection matrix $C_r$ indicating the reflection by the coupler is expressed as follows:

$$C_r = \begin{pmatrix} \sqrt{1-\kappa_x} & 0 \\ 0 & \sqrt{1-\kappa_y} \end{pmatrix} \quad (8)$$

The transmission matrix $C_t$ indicating the transmission by the coupler is expressed as follows:

$$C_t = \begin{pmatrix} j\sqrt{\kappa_x} & 0 \\ 0 & j\sqrt{\kappa_y} \end{pmatrix} \begin{pmatrix} \cos(\theta_R) & -\sin(\theta_R) \\ -\sin(\theta_R) & -\sin(\theta_R) \end{pmatrix} \quad (9)$$

The matrix $C_l$ indicating the loss is expressed as follows:

$$C_l = \begin{pmatrix} \sqrt{1-r_x} & 0 \\ 0 & \sqrt{1-r_y} \end{pmatrix} \quad (10)$$

The splice in the ring resonator is expressed as follows:

$$R(\theta)\begin{pmatrix} \cos(\theta) & -\sin(\theta) \\ \sin(\theta) & \cos(\theta) \end{pmatrix} \quad (11)$$

where $\theta$ is the angle of rotation.

The transfer matrix of the fiber is given by the formula (12) using this rotation.

$$A(\varphi) = \exp\{-j\xi(z/L)\}\exp(-i\beta_{AV}z)C(\varphi) \quad (12)$$

where $$C(\varphi) = \begin{bmatrix} C_{11} & C_{12} \\ C_{21} & C_{22} \end{bmatrix}$$

$C_{11}C_{22}^* = \cos(\eta z) - j\{\Delta\beta/(2\eta)\}\sin(\eta z)$
$C_{12} = -C_{21} = (\phi/\eta)\sin(\eta z)$
$\eta = \sqrt{(\Delta\beta/2)^2 + \phi^2}$
$\beta_{AV} = (\beta_x + \beta_y)/2$
$\Delta\beta = \beta_x - \beta_y$
$\phi = \theta/L$ where $\beta_i$ (i=x, y) is the propagation constant of two polarization axes of the polarization maintaining fiber, and $\Delta\beta$ is the difference in propagation constant of two polarization axes of the polarization maintaining fiber. $\xi$ is the parameter used in the analysis, and indicates the phase change, i.e., that the phase difference is generated between two light waves of the polarization maintaining fiber propagating in the ring resonator and different in periodicity by one trip.

Using the formulae (11) and (12), the transfer matrix $F_{bCW}$ of the sensing loop of the CW light is expressed as follows:

$$F_{bCW} = A(\varphi)|_{Z=L_2} \cdot R(\theta) \cdot A(\varphi)|_{Z=L_1} \quad (13)$$

$$= \exp(-j\xi)\exp(-j\beta_{AV}L)\begin{bmatrix} t_{11CW} & t_{12CW} \\ t_{21CW} & t_{22CW} \end{bmatrix}$$

Using this, the transfer matrix $T_{CW}$ of the CW light making one trip around the ring resonator of is expressed as follows:

$$T_{CW} C_1 C_r F_{bCW} \quad (14)$$

where the loss in the sensing loop is included in the loss in the coupler.

The eigenvalues of $T_{CW}$ are $\lambda_{1CW}$ and $\lambda_{2CW}$, and the eigenvector to $kX_{CW}$ is given by:

$$\begin{bmatrix} X_{1CW} \\ Y_{1CW} \end{bmatrix} \quad (15)$$

and the eigenvector to $\lambda_{2CW}$ is given by:

$$\begin{bmatrix} X_{2CW} \\ Y_{2CW} \end{bmatrix} \quad (16)$$

Using the eigenvalues and eigenvectors, $T_{CW}$ is rewritten as follows:

$$T_{CW} = Z_{CW}\Lambda_{CW}Z_{CW}^{-1} \quad (17)$$

where $$Z_{CW} = \begin{pmatrix} X_{1CW} & X_{2CW} \\ Y_{1CW} & Y_{2CW} \end{pmatrix} \quad (18)$$

$$\Lambda_{CW} = \begin{pmatrix} \lambda_{1CW} & 0 \\ 0 & \lambda_{2CW} \end{pmatrix} \quad (19)$$

From the following relationship, $$T_{CW}^m = (Z_{CW}\Gamma_{CW}^{n+1}Z_{CW}^{-1})^m \quad (20)$$

$$Z_{CW}\Gamma_{CW}^m Z_{CW}^{-1}$$

$$\sum_{n=0}^{\infty} T_{CW}^{n+1} = \sum_{n=0}^{\infty} (Z_{CW}\Lambda_{CW}^{n+1}Z_{CW}^{-1}) \quad (21)$$

$$= Z_{CW}\sum_{n=0}^{\infty} \Lambda_{CW}^{n+1}Z_{CW}^{-1}$$

$$= Z_{CW}\sum_{n=0}^{\infty}\begin{pmatrix} \lambda_{1CW}^{n+1} & 0 \\ 0 & \lambda_{2CW}^{n+1} \end{pmatrix} Z_{CW}^{-1}$$

-continued $$= Z_{CW} \begin{pmatrix} \sum_{n=0}^{\infty} \lambda_{1CW}^{n+1} & 0 \\ 0 & \sum_{n=0}^{\infty} \lambda_{2CW}^{n+1} \end{pmatrix} Z_{CW}^{-1}$$

$$= Z_{CW} \begin{pmatrix} \dfrac{\lambda_{1CW}}{1-\lambda_{1CW}} & 0 \\ 0 & \dfrac{\lambda_{2CW}}{1-\lambda_{2CW}} \end{pmatrix} Z_{CW}^{-1}$$

$$= Z_{CW} \Gamma_{CW} Z_{CW}^{-1}$$

where $$\Gamma_{CW} = \begin{pmatrix} \dfrac{\lambda_{1CW}}{1-\lambda_{1CW}} & 0 \\ 0 & \dfrac{\lambda_{2CW}}{1-\lambda_{2CW}} \end{pmatrix} \tag{22}$$

The transfer matrix $T_{CCW}$ of the CCW light making one trip around the ring resonator of is expressed as follows:

$$T_{CCW} = C_r C_t F_{bCCW}$$

$$F_{bCCW} = F_{bCW}^{\dagger} \tag{23}$$

where $\dagger$ indicates the adjoint matrix.

The eigenvalues $\lambda_{1CCW}$ and $\lambda_{2CCW}$ of $T_{CCW}$ are related to each other by the following expression:

$$\begin{bmatrix} \lambda_{1CCW} \\ \lambda_{2CCW} \end{bmatrix} = \begin{bmatrix} \lambda_{1CW} \\ \lambda_{2CW} \end{bmatrix} \tag{24}$$

The eigenvector for $\lambda_{1CCW}$ is expressed as follows:

$$\begin{bmatrix} X_{1CCW} \\ Y_{1CCW} \end{bmatrix} = \begin{bmatrix} X_{1CW}^* \\ Y_{1CW}^* \end{bmatrix} \tag{25}$$

The eigenvector for $\lambda_{2CCW}$ is expressed as follows:

$$\begin{bmatrix} X_{2CCW} \\ Y_{2CCW} \end{bmatrix} = \begin{bmatrix} X_{2CW}^* \\ Y_{2CW}^* \end{bmatrix} \tag{26}$$

Then, $T_{CCW}$ is rewritten as follows:

$$T_{CCW} = Z_{CCW} \Lambda_{CCW} Z_{CCW}^{-1} \tag{27}$$

where $$Z_{CCW} = \begin{pmatrix} X_{1CCW} & X_{2CCW} \\ Y_{1CCW} & Y_{2CCW} \end{pmatrix} \tag{28}$$

$$\Lambda_{CCW} = \begin{pmatrix} \lambda_{1CCW} & 0 \\ 0 & \lambda_{2CCW} \end{pmatrix} \tag{29}$$

Similar to CW, the following relationship is derived.

$$\sum_{n=0}^{\infty} T_{CCW}^{n+1} = Z_{CCW} \Gamma_{CCW} Z_{CCW}^{-1} \tag{30}$$

where $$\Gamma_{CCW} = \begin{pmatrix} \dfrac{\lambda_{1CCW}}{1-\lambda_{1CCW}} & 0 \\ 0 & \dfrac{\lambda_{2CCW}}{1-\lambda_{2CCW}} \end{pmatrix} \tag{31}$$

The light wave emitted from the laser beam source is the linearly polarized wave, and assumed to be incident on X-axis of the polarization maintaining fiber.

The incident light $E_{0CW}$ is expressed as follows:

$$E_{0CW} = \begin{pmatrix} \cos(\theta_{iCW}) \\ \sin(\theta_{iCW}) \end{pmatrix} \tag{32}$$

where $\theta_{iCW}$ is the angular deviation to X-axis of the polarization maintaining fiber.

$E_{0CW}$ firstly passes through a polarizer $P_1$ of the lead part. $P_1$ is expressed as follows:

$$P_1 = \begin{pmatrix} 1 & 0 \\ 0 & \varepsilon_1 \end{pmatrix} \tag{33}$$

The light wave $E_{1CW}$ passing through the polarizer $P_1$ is expressed as follows:

$$E_{1CW} P_1 E_{0CW} \tag{34}$$

Using $E_{1CW}$ and the formula (21), the light wave $E_{2CW}$ inputted in the coupler with the CW light making trips around the ring resonator is expressed as follows:

$$\begin{aligned} E_{2CW} &= F_{bCW} \sum_{n=0}^{\infty} T_{CW}^n C_1 C_t E_{1CW} \\ &= (C_1 C_r)^{-1} T_{CW} \sum_{n=0}^{\infty} T_{CW}^n C_1 C_t E_{1CW} \\ &= (C_1 C_r)^{-1} \sum_{n=0}^{\infty} T_{CW}^{n+1} C_1 C_t E_{1CW} \\ &= (C_1 C_r)^{-1} Z_{CW} \Gamma_{CW} Z_{CW}^{-1} C_1 C_t E_{1CW} \end{aligned} \tag{35}$$

Using $E_{1CW}$ and $E_{2CW}$, the light wave $E_{3CW}$ outputted from the ring resonator is expressed as follows:

$$E_{3CW} C_t (C_r E_{1CW} + C_t E_{2CW}) \tag{36}$$

This light wave passes through a polarizer $P_2$ of the lead part. $P_2$ is expressed as follows:

$$P_2 = \begin{pmatrix} 1 & 0 \\ 0 & \varepsilon_2 \end{pmatrix} \tag{37}$$

The light wave $E_{dCW}$ inputted in a light receiver is expressed as follows:

$$E_{dDCW} = P_2 E_{3CW} \tag{38}$$

The light reception intensity of the CW light observed by the light receiver is expressed as follows:

$$|E_{dCW}|^2 = E_{dCW}^{\dagger} E_{dCW} \tag{39}$$

Similar to CW, the incident light $E_{0CCW}$ is expressed as follows:

$$E_{0CCW} = \begin{pmatrix} \cos(\theta_{iCCW}) \\ \sin(\theta_{iCCW}) \end{pmatrix} \quad (40)$$

where $\theta_{iCCW}$ is the angular deviation to X-axis of the polarization maintaining fiber. The incident light passes through the polarizer $P_2$, and the light wave after passing through the polarizer is expressed as follows:

$$E_{3CCW} = P_2 E_{0CCW} \quad (41)$$

Using $E_{3CCW}$ and the formula (30), the light wave $E_{4CCW}$ inputted in the coupler with the CW light making trips around the ring resonator is expressed as follows:

$$E_{4CCW} = F_{bCCW} \sum_{n=0}^{\infty} T_{CCW}^n C_1 C_t E_{3CCW} \quad (42)$$
$$= (C_1 C_r)^{-1} Z_{CCW} \Gamma_{CCW} Z_{CCW}^{-1} C_1 C_t E_{3CCW}$$

Using $E_{3CCW}$ and $E_{4CCW}$, the light wave $E_{1CCW}$ outputted from the ring resonator is expressed as follows:

$$E_{1CCW} = C_t(C_r W_{3CCW} + C_t E_{4CCW}) \quad (43)$$

This light wave passes through the polarizer $P_1$ of the lead part, and the light wave $E_{dCCW}$ inputted in the light receiver is expressed as follows:

$$E_{dCCW} = P_1 E_{1CCW} \quad (44)$$

The light reception intensity of the CCW light observed by the light receiver is expressed as follows:

$$|E_{dCCW}|^2 = E_{dCCW}^\dagger C_{dCCW} \quad (45)$$

The resonance characteristics of the CW light and CCW light are obtained from the formulae (39) and (45) by changing $\xi$ in the formulae (12) and (13). This means that the light reception intensity of the CW light and CCW light are respectively expressed as the function of $\xi$ as follows:

$$|E_{dCW}|^2 = I_{dCW}(\xi)$$
$$|E_{dCW}|^2 = I_{dCCW}(\xi) \quad (46)$$

Figure 2:
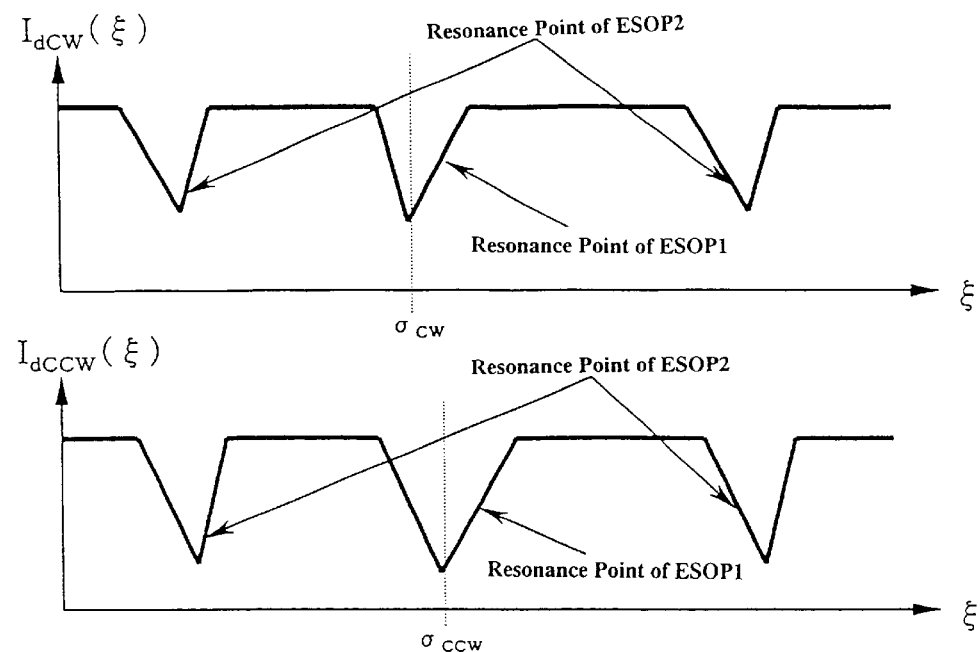
FIG. 2 is a schematic representation for explaining a calculating method of a resonance point from the resonance characteristic.
Figure 2:
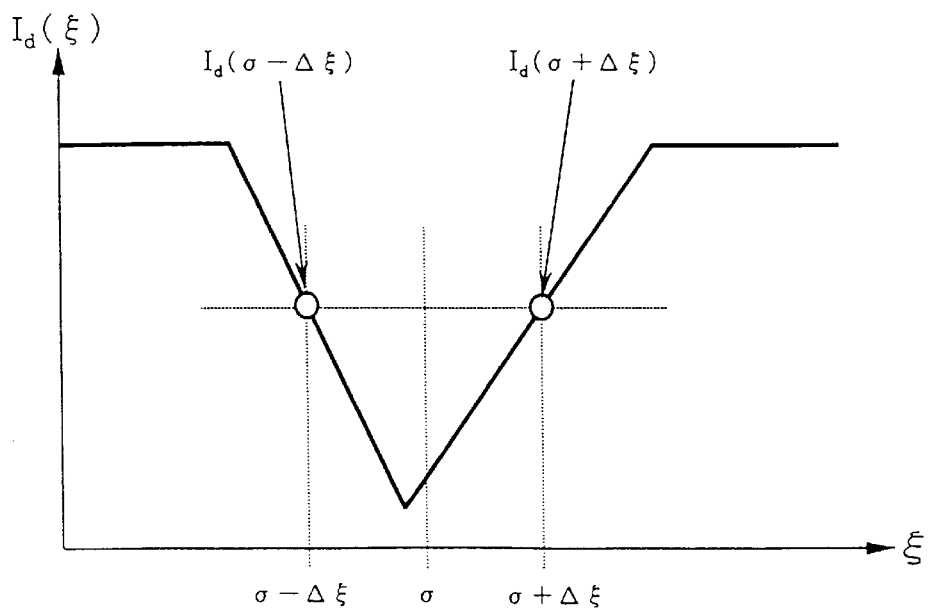

FIGS. 2(a) and 2(b) are conceptual views showing the calculation methods of the resonance characteristics and the resonance points of the CW light and CCW light with respect to $\xi$, respectively.

The resonance points used in this analysis are calculated by changing $\xi$ around the resonance point as shown FIG. 2(b) taking into consideration the bias modulation around the resonance point, and detecting u at which the light reception intensity around the $\xi$ value is equal to each other. This means that $\sigma_{CW}$ to satisfy the following formula is calculated as the position of the resonance point of CW.

$$I_{dCW}(\sigma_{CW} - \Delta\xi_{CW}) = I_{dCW}(\sigma_{CW} - \Delta\xi_{CW}) \quad (47)$$

Similarly, $\sigma_{CCW}$ to satisfy the following formula is calculated as the position of the resonance point of CCW.

$$I_{dCCW}(\sigma_{CCW} - \Delta\xi_{CCW}) = I_{dCCW}(\sigma_{CCW} + \Delta\xi_{CCW}) \quad (48)$$

$\Delta\xi_{CW}$ and $\Delta\xi_{CCW}$ express the depth of modulation of the bias modulation to the CW light and CCW light, respectively, and are set to be $\Delta\xi_{CW} = \Delta\xi_{CCW}$, and half width at half maximum at the resonance point.

The error corresponds to the difference between $\sigma_{CW}$ and $\sigma_{CCW}$, and the error of the gyro output is given as follows similar to the formula (6):

$$\Delta\Omega = \frac{c_0 \lambda}{4\pi L r}(\sigma_{CW} - \sigma_{CCW}) \quad (49)$$

FIGS. 3A to 3J show the results of the numerical simulation of the errors when using the reflector ring resonator.

Figure 3A:
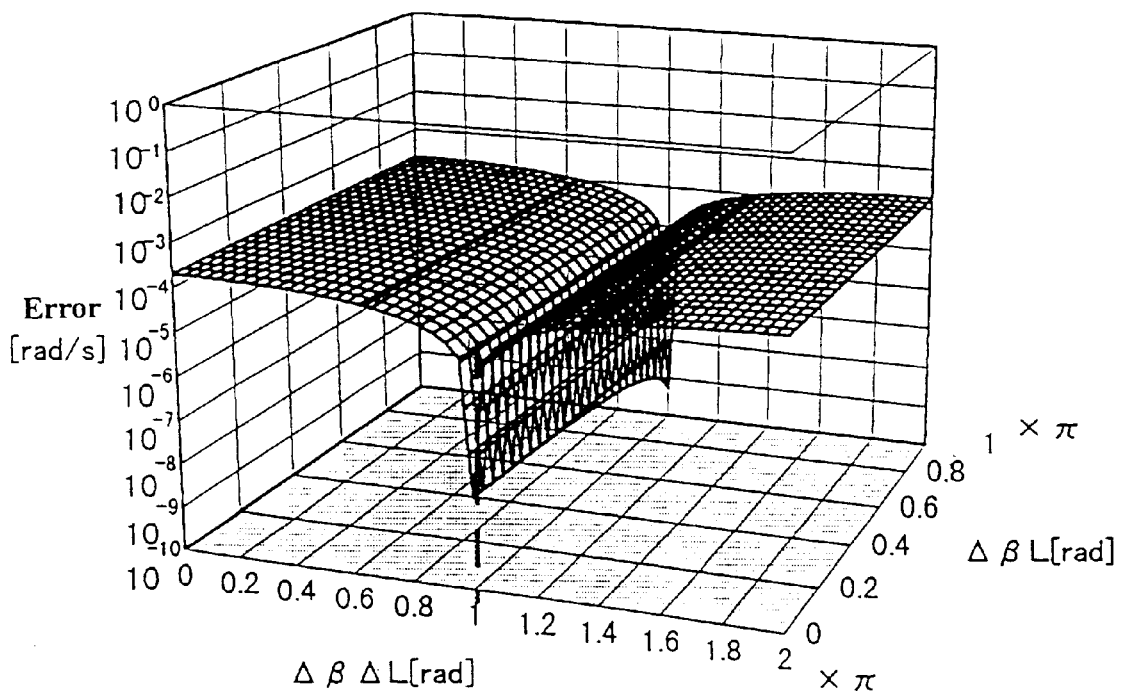
FIG. 3A is a graph showing the result of the numerical simulation of the errors using a reflector ring resonator with $\epsilon_1=\epsilon_2=0.01$.

FIG. 3A shows the result of the numerical simulation of the error when $\epsilon_1 = \epsilon_2 = 0.01$ assuming the polarizer at the lead part. Other parameters include $\theta = 89°$, $\kappa_x = \kappa_y = 0.02$, $\gamma_x = \gamma_y = 0.02$, and $\theta_R = 0°$.

In the figure, it is shown that the error is minimized from the following relationship.

$$\Delta\beta\Delta L = \pi + 2n\pi [\text{radian}] (n: \text{integer}) \quad (A)$$

Figure 3B:
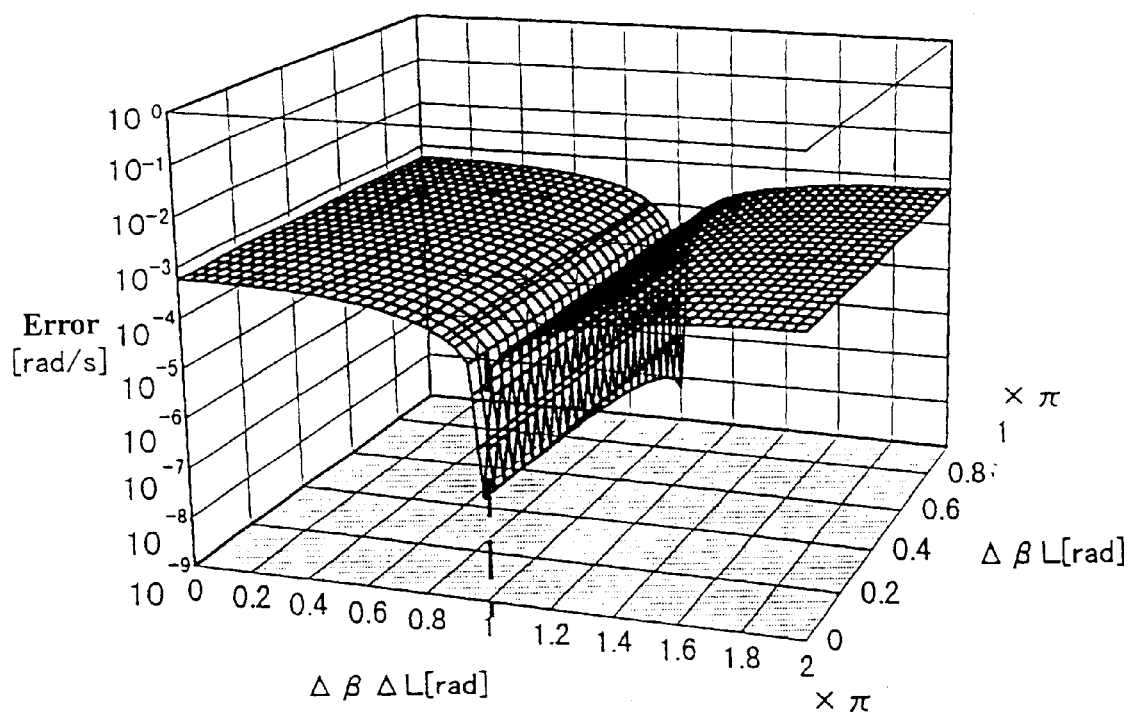
FIG. 3B is a graph showing the result of the numerical simulation of the errors using the reflector ring resonator with $\epsilon_1=\epsilon_2=0.99$.

FIG. 3B shows the result of the numerical simulation of the error when $\epsilon_1 = \epsilon_2 = 0.99$ assuming the loss of polarization dependency at the lead part. Other parameters are same as those in FIG. 3A. In the figure, it is shown that the error is minimized from the relationship of the formula (A) similar to FIG. 3A.

Figure 3C:
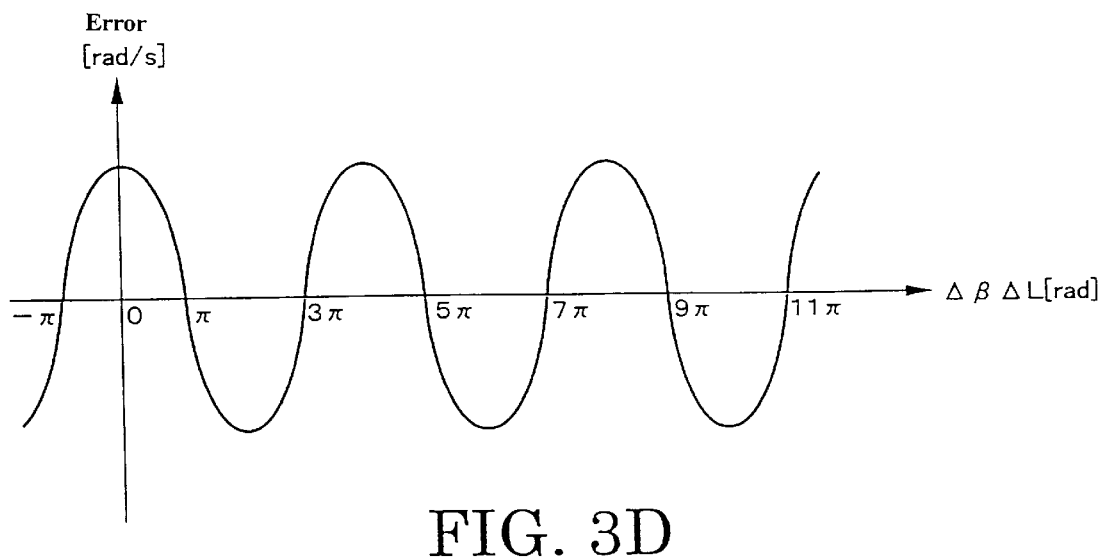
FIG. 3C is a graph showing the mode of generation of the errors to $\Delta\beta\Delta L$.

It is shown from these findings that the mode of generation of the error to $\Delta\beta\Delta L$ as shown in FIG. 3C taking into consideration the sign of the error means the oscillation with the period of $2\pi$.

Figure 3D:
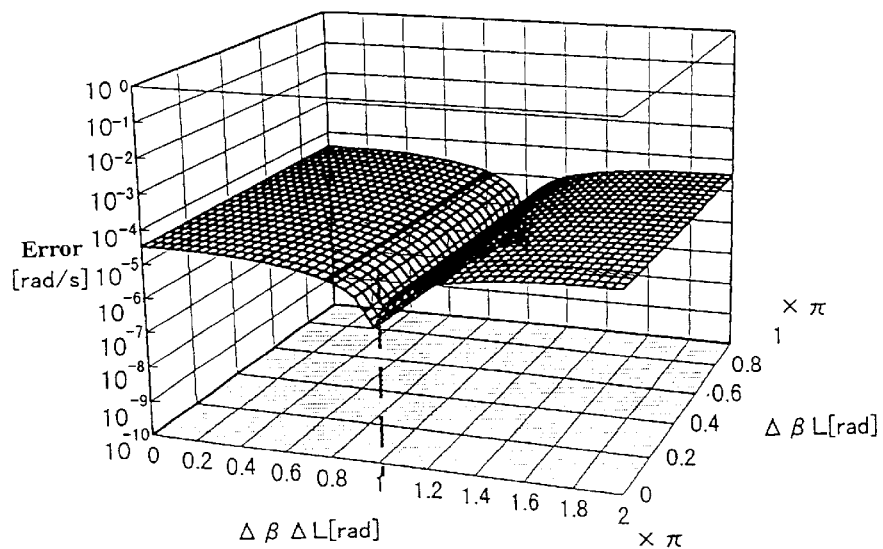
FIG. 3D is a graph showing the result of the numerical simulation of the errors when the polarization dependency is assumed only in a coupler with $\kappa_x\neq\kappa_y$, $\gamma_x\neq\gamma_y$, and $\epsilon_1=\epsilon_2=1$.

FIG. 3D shows the error when the polarization dependency is present only in the coupler with $\epsilon_1 = \epsilon_2 = 1$ where no loss is present in the polarizer or polarization dependency at the lead part. This shows the result of the numerical simulation of the error with $\kappa_x \neq \kappa_y$, $\gamma_x \neq \gamma_y$. Other parameters include $\theta = 89°$, $\kappa_x = 0.02$, $\kappa_y = 0.022$, $\gamma_x = 0.02$, $\gamma_y = 0.022$, and $\theta_R = 20$. It is shown from the figures that the error is minimized from the relationship in the formula (A) similar to the cases of FIGS. 3A and 3B.

From the results in FIGS. 3A, 3B and 3D, it can be confirmed that generation of the errors caused by the loss of the polarization dependency has a same characteristic.

Figure 3E:
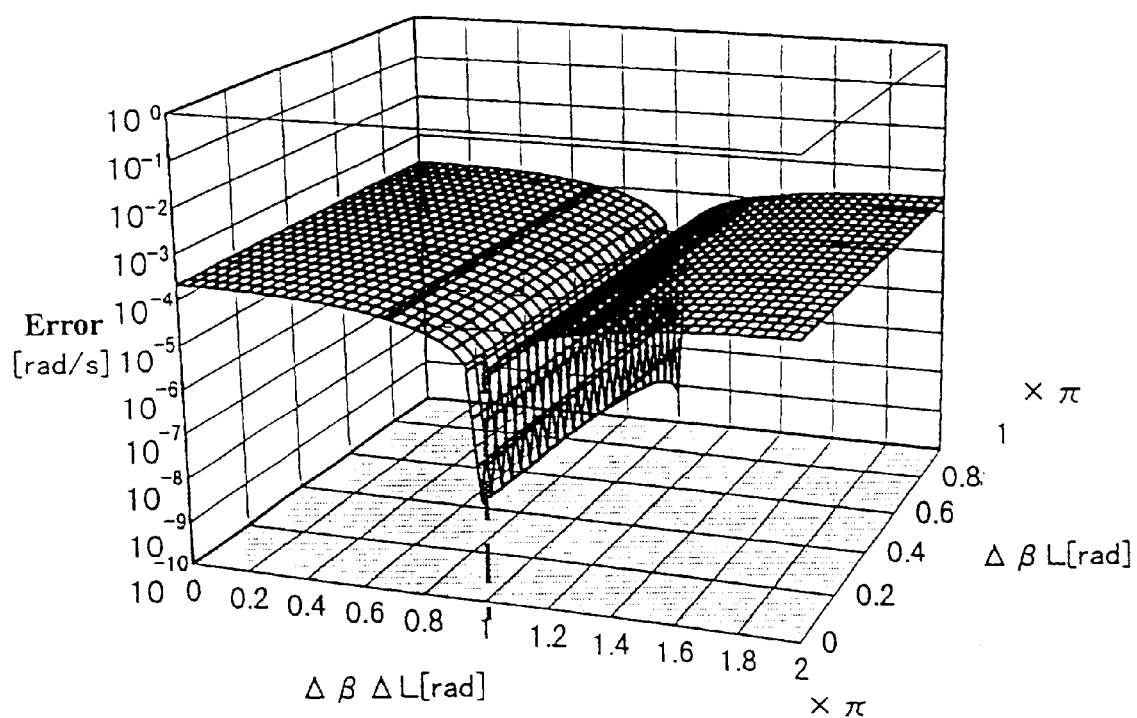
FIG. 3E is a graph showing the result of the numerical simulation of the errors when the polarization dependency is assumed in a lead part and the coupler with $\kappa_x\neq\kappa_y$, $\gamma_x\neq\gamma_y$, and $\epsilon_1=\epsilon_2=0.01$.
Figure 3F:
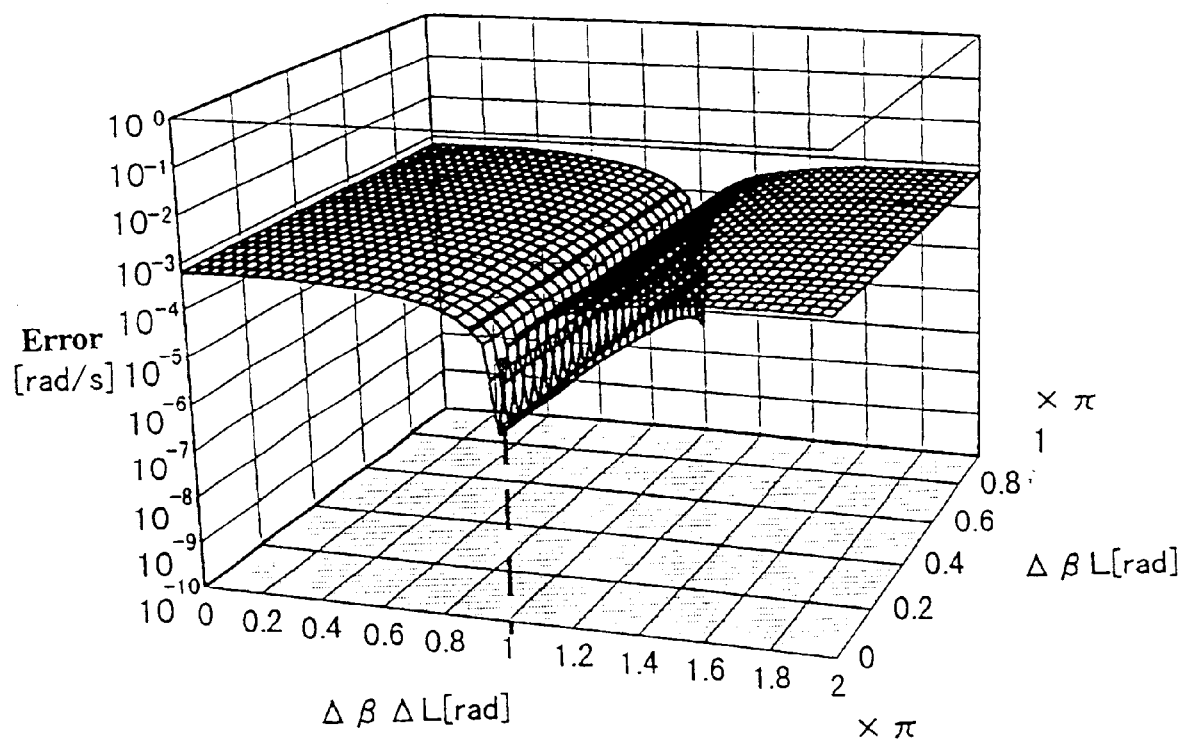
FIG. 3F is a graph showing the result of the numerical simulation of the errors when the polarization dependency is assumed in the lead part and the coupler with $\kappa_x\neq\kappa_y$, $\gamma_x\neq\gamma_y$, and $\epsilon_1=\epsilon_2=0.99$.
Figure 3G:
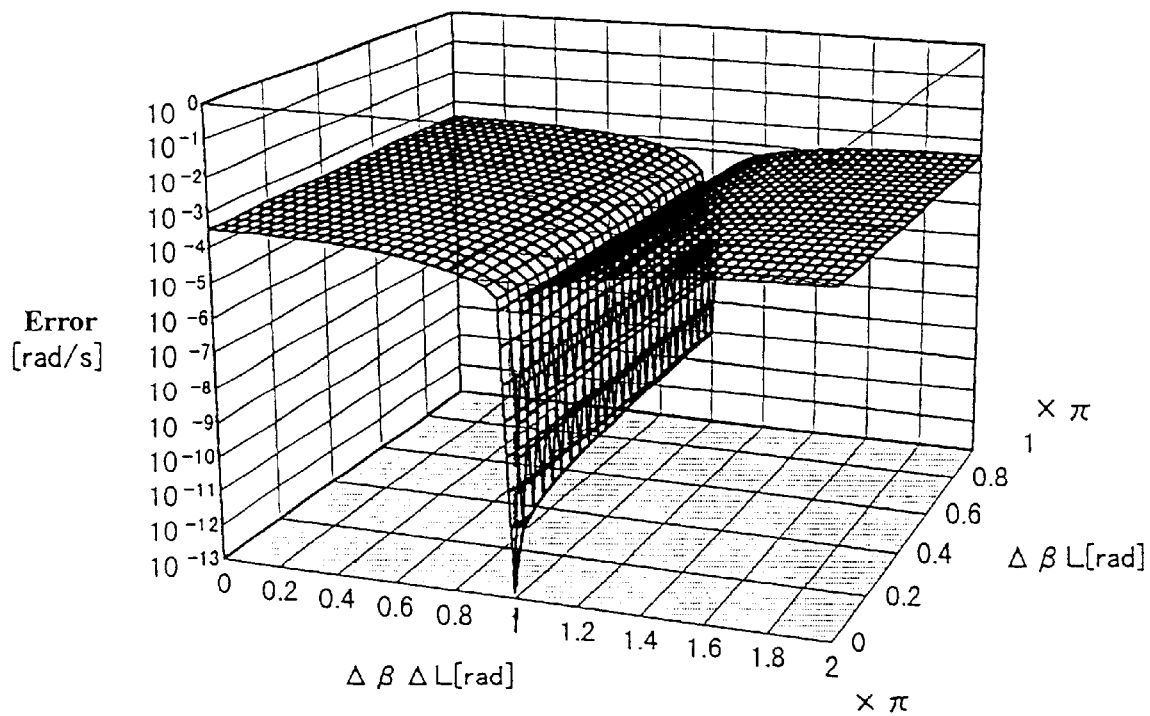
FIG. 3G is a graph showing the result of the analysis when the splice angle $\theta$ in the ring resonator is set to be $\theta=90°$.
Figure 3H:
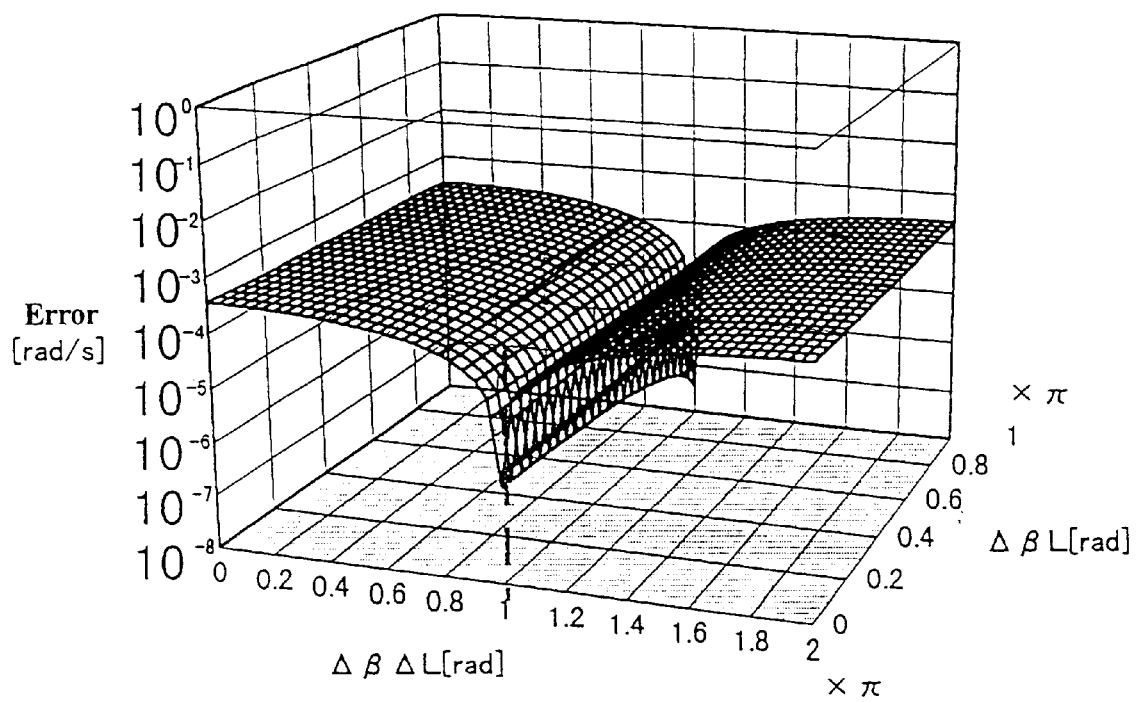
FIG. 3H is a graph showing the result of the analysis when the splice angle $\theta$ in the ring resonator is set to be $\theta=75°$.
Figure 3I:
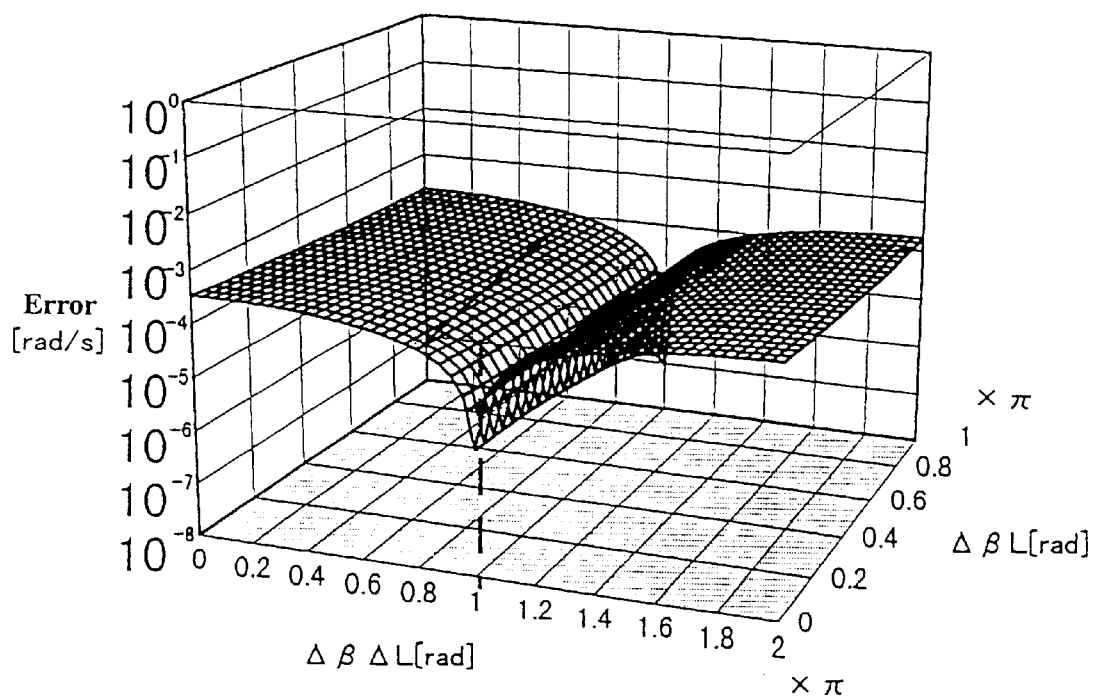
FIG. 3I is a graph showing the result of the analysis when the splice angle $\theta$ in the ring resonator is set to be $\theta=45°$.
Figure 3J:
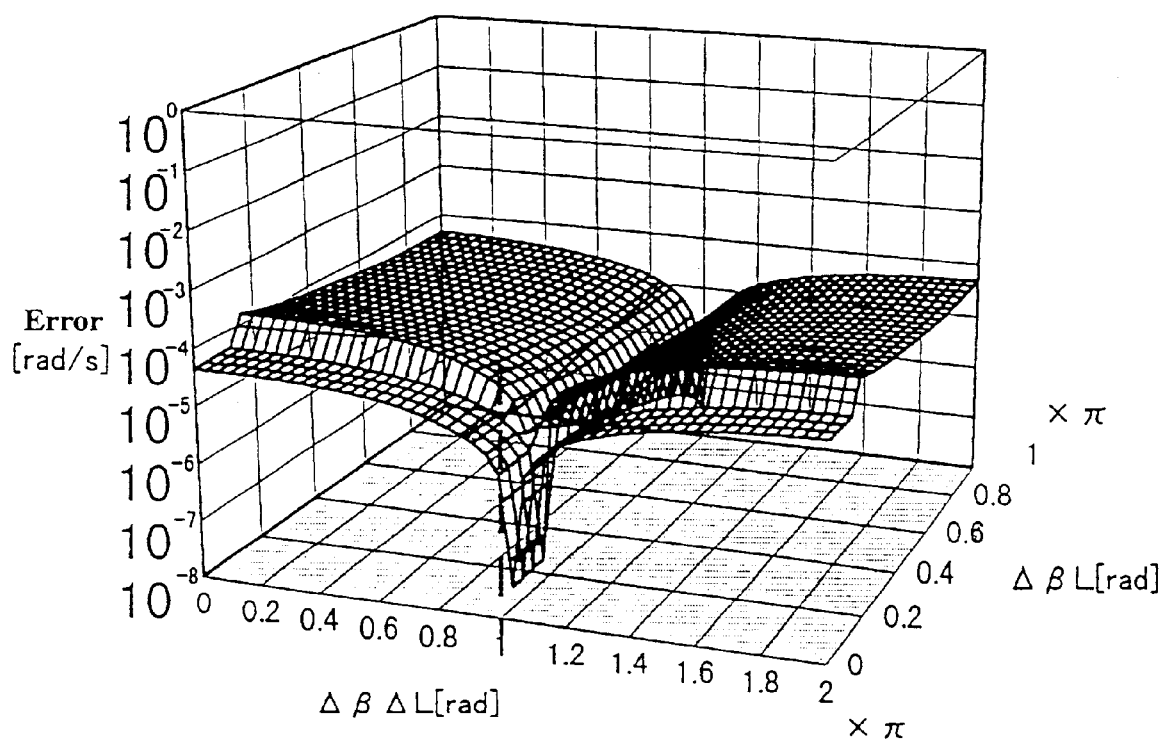
FIG. 3J is a graph showing the result of the analysis when the splice angle θ in the ring resonator is set to be θ=10°.

FIGS. 3E and 3F show the numerical simulation of the errors when the polarization dependency is assumed at the lead part and the coupler. The polarization dependency at the lead part is set to be $\epsilon_1 \epsilon_2 = 0.01$ and $\epsilon_1 \epsilon_2 = 0.99$, respectively. Other parameters include $\theta = 89°$, $\kappa_x = 0.02$, $\kappa_y = 0.022$, $\gamma_x = 0.02$, $\gamma_y = 0.022$, and $\theta_R = 2°$ for each case. It is shown from the figures that the error is minimized from the relationship in the formula (A) similar to the cases of FIGS. 3A, 3B and 3D.

It is understood from the above results that the error generated by the polarization dependency loss is minimized when satisfying the relationship of the formula (A). In addition, the error is substantially constant to $\Delta\beta L$ for the predetermined $\Delta\beta\Delta L$. This means that the error of the gyro output is very small in dependency of $\Delta\beta L$, and dependent on $\Delta\beta\Delta L$.

$\Delta\beta L$ is changed by at least $\pi$ in about 1° C., and considerably affected by the environmental temperature, and the effect of the environmental temperature on $\Delta\beta\Delta L$ can be kept very small by reducing $\Delta L$ while satisfying the relationship of the formula (A).

Thus, the error of the gyro output can be reduced irrespective of the environmental temperature by using the relationship of the formula (A).

FIGS. 3G to 3J show the result of the analysis when the splice angle $\theta$ in the ring resonator is changed such as $\theta = 90°$, 75°, 45° and 10°. Other parameters include $\epsilon_1 \epsilon_2 = 0.01$, $\epsilon_x = 0.02$, $\epsilon_y = 0.022$, $\gamma_x = 0.02$, $\gamma_y = 0.022$, and $\theta_R = 2°$ for each case.

It is shown from the figures that the error is minimized when $\Delta\beta\Delta L$ satisfies the relationship of the formula (A).

(Transmitter Ring Resonator)

The analysis of the errors will be described below when using a transmitter ring resonator in the resonator fiber optic gyro with the method in accordance with the present invention applied thereto.

Figure 4:
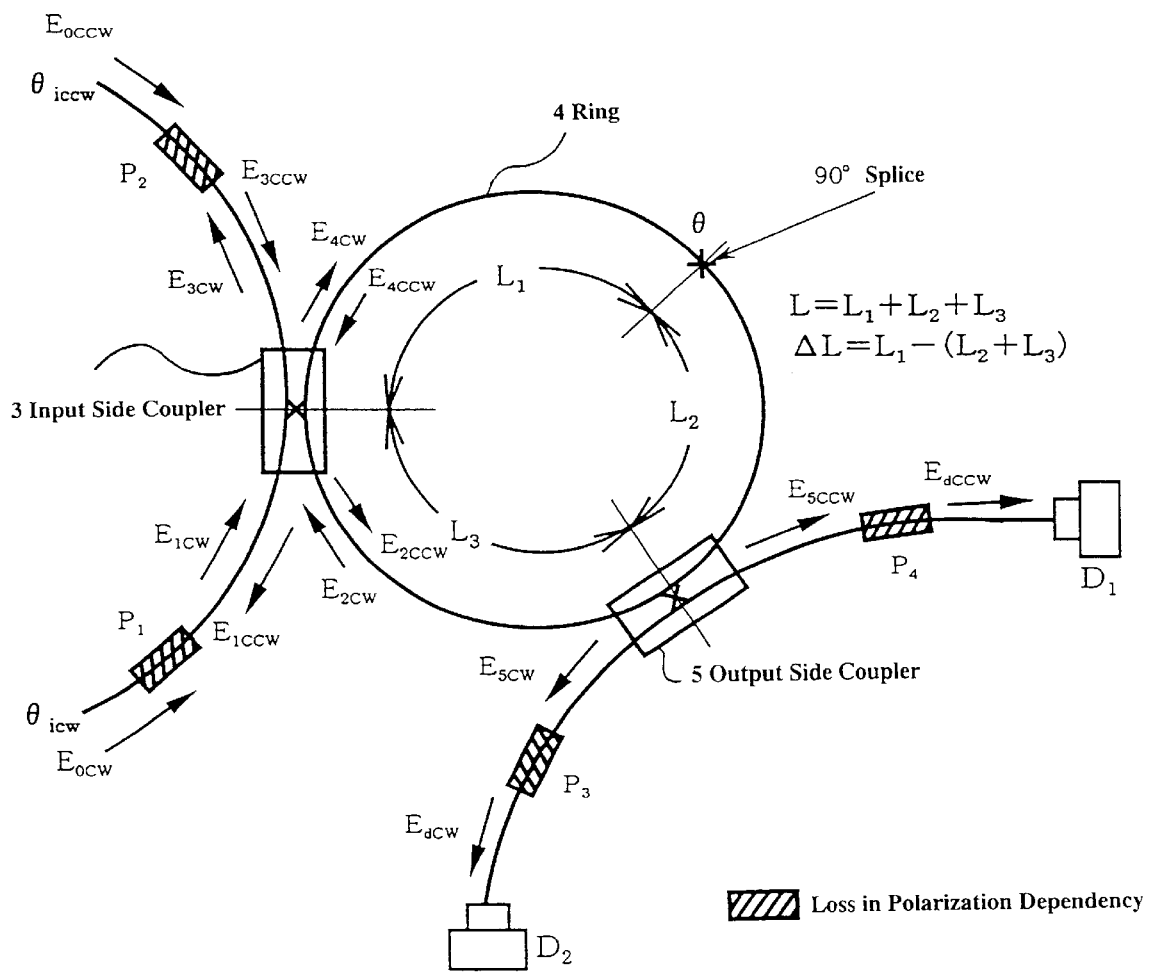
FIG. 4 is a graph showing a schematic representation for explaining a second embodiment of the resonator fiber optic gyro in accordance with the present invention, and an overall view of the transmitter ring resonator model.

FIG. 4 shows a model of the transmitter ring resonator used in the analysis.

$\Delta L$ is defined here to be $\Delta L = L_1 - (L_2 + L_3)$. This is equal in that the sum and the difference of two portions of the optical fiber divided by the model of the reflector ring resonator, the incident side coupler and the 90° splice point are L and $\Delta L$, respectively.

In FIG. 5, $P_1$ and $P_2$ of the input side lead part, and $P_3$ and $P_4$ of the output side lead part are assumed to be the losses of the polarization dependency.

The reflection matrix $C_{1r}$ indicating the reflection of the input side coupler is expressed as follows:

$$C_{1r} = \begin{pmatrix} \sqrt{1-\kappa_{1x}} & 0 \\ 0 & \sqrt{1-\kappa_{1y}} \end{pmatrix} \tag{50}$$

The transmission matrix $C_{1t}$ indicating the transmission is expressed by the formula (51).

$$C_{1t} = \begin{pmatrix} j\sqrt{\kappa_{1x}} & 0 \\ 0 & j\sqrt{\kappa_{1x}} \end{pmatrix}\begin{pmatrix} \cos(\theta_{R1}) & -\sin(\theta_{R1}) \\ -\sin(\theta_{R1}) & -\sin(\theta_{R1}) \end{pmatrix} \tag{51}$$

The matrix $C_{1l}$ indicating the loss is expressed as follows:

$$C_{1l} = \begin{pmatrix} \sqrt{1-r_{1x}} & 0 \\ 0 & \sqrt{1-r_{1y}} \end{pmatrix} \tag{52}$$

The reflection matrix $C_{2r}$ indicating the reflection of the output side coupler is expressed as follows:

$$C_{2r} = \begin{pmatrix} \sqrt{1-\kappa_{2x}} & 0 \\ 0 & \sqrt{1-\kappa_{2y}} \end{pmatrix} \tag{53}$$

The transmission matrix $C_{2t}$ indicating the transmission is expressed by the formula (54).

$$C_{2t} = \begin{pmatrix} j\sqrt{\kappa_{2x}} & 0 \\ 0 & j\sqrt{\kappa_{2x}} \end{pmatrix}\begin{pmatrix} \cos(\theta_{R2}) & -\sin(\theta_{R2}) \\ -\sin(\theta_{R2}) & -\sin(\theta_{R2}) \end{pmatrix} \tag{54}$$

The matrix $C_{2l}$ indicating the loss is expressed as follows:

$$C_{2l} = \begin{pmatrix} \sqrt{1-r_{2x}} & 0 \\ 0 & \sqrt{1-r_{2y}} \end{pmatrix} \tag{55}$$

The rotation in the ring resonator is expressed similar to the formula (11) using the splice angle $\theta$. The transfer matrix of the fiber is expressed similar to the formula (12).

The transfer matrix of the sensing loop of the CW light is expressed as follows:

$$\left(F_{bcw} = A(\varphi)|_{z=L_3} \cdot C_{2l}C_{2r}A(\varphi)|_{z=L_2} \cdot R(\theta) \cdot A(\varphi)\right)\Big|_{z=L_1} \tag{56}$$

$$= \exp\{-j(\beta_{AV} + \xi)L\}\begin{bmatrix} t_{11CW} & t_{12CW} \\ t_{21CW} & t_{22CW} \end{bmatrix}$$

Using this, the transfer matrix $T_{CW}$ per trip of the ring resonator of the CW light is expressed as follows:

$$T_{CW} = C_{1t}C_{1r}F_{bCW} \tag{57}$$

The transfer matrix $T_{CCW}$ per trip of the ring resonator of the CCW light is expressed as follows:

$$T_{CCW} = C_{1t}C_{1r}F_{bCCW}$$

$$F_{bCCW} = F_{bCW}^{\dagger} \tag{58}$$

The eigenvalue and the eigenvector are expressed similar to the formulae (21) and (30) as follows:

$$\sum_{n=0}^{\infty} T_{CW}^{n+1} = z_{CW}\Gamma_{CW}z_{CW}^{-1} \tag{59}$$

$$\sum_{n=0}^{\infty} T_{CCW}^{n+1} = z_{CCW}\Gamma_{CCW}z_{CCW}^{-1} \tag{60}$$

where $$Z_{CW(CCW)} = \begin{pmatrix} X_{1CW(CCW)} & X_{2CW(CCW)} \\ Y_{1CW(CCW)} & Y_{2CW(CCW)} \end{pmatrix} \tag{61}$$

$$\Gamma_{CW(CCW)} = \begin{pmatrix} \dfrac{\lambda_{1CW(CCW)}}{1-\lambda_{1CW(CCW)}} & 0 \\ 0 & \dfrac{\lambda_{2CW(CCW)}}{1-\lambda_{2CW(CCW)}} \end{pmatrix} \tag{62}$$

The incident light $E_{0CW}$ of CW is expressed as follows:

$$E_{0CW} = \begin{pmatrix} \cos(\theta_{iCW}) \\ \sin(\theta_{iCW}) \end{pmatrix} \tag{63}$$

where $\theta_{iCW}$ is the angular deviation to X-axis of the polarization maintaining fiber.

$E_{0CW}$ firstly passes through the polarization dependency loss (polarizer) $P_1$ of the input side lead part. $P_1$ is expressed as follows:

$$P_1 = \begin{pmatrix} 1 & 0 \\ 0 & \varepsilon_1 \end{pmatrix} \tag{64}$$

The present invention $E_{1CW}$ passing through the polarizer $P_1$ is expressed as follows:

$$E_{1CW} = P_1 E_{0CW} \tag{65}$$

Using $E_{1CW}$ and the formula (59), the light wave $E_{2CW}$ to be inputted in the incident side coupler with the CW light making trips around the ring resonator is expressed as follows:

$$E_{2CW} = F_{bCW} \sum_{n=0}^{\infty} T_{CW}^n C_{1l} C_{1r} C_{1CW} \tag{66}$$

$$= (C_{1l} C_{1r})^{-1} T_{CW} \sum_{n=0}^{\infty} T_{CW}^n C_{1l} C_{1r} E_{1CW}$$

$$= (C_{1l} C_{1r})^{-1} \sum_{n=0}^{\infty} T_{CW}^{n+1} C_{1l} C_{1r} E_{1CW}$$

$$= (C_{1l} C_{1r})^{-1} Z_{CW} \Gamma_{CW} Z_{CW}^{-1} C_{1l} C_{1r} E_{1CW}$$

Using $E_{1CW}$ and $E_{2CW}$, the light wave $E_{4CW}$ to be inputted in the incident side coupler with the CW light making trips around the ring resonator is expressed as follows:

$$E_{4CW} = C_{11}(C_{1l} E_{1CW} + C_{1r} E_{2CW}) \tag{67}$$

In addition, using $E_{4CW}$, the light wave $E_{5CW}$ outputted from the ring resonator is expressed as follows:

$$E_{5CW} = A(\phi)|_{z=L_2} \cdot R(\theta) \cdot A(\phi)|_{z=L_1} E_{4CW} \tag{68}$$

This light wave passes through the polarization dependency loss (polarizer) $P_3$ at the output side lead part. $P_3$ is expressed as follows:

$$P_3 = \begin{pmatrix} 1 & 0 \\ 0 & \varepsilon_3 \end{pmatrix} \tag{69}$$

The light wave $E_{dCW}$ inputted in the light receiver is expressed as follows:

$$E_{dCW} = P_3 E_{5CW} \tag{70}$$

The light reception intensity of the CW light observed by the light receiver is expressed as follows:

$$|E_{dCW}|^2 = E_{dCW}^\dagger E_{dCW} \tag{71}$$

Similar to CW, the incident light $E_{0CCW}$ is expressed as follows:

$$E_{0CCW} = \begin{pmatrix} \cos(\theta_{iCCW}) \\ \sin(\theta_{iCCW}) \end{pmatrix} \tag{72}$$

where $\theta_{iCCW}$ is the angular deviation to X-axis of the polarization maintaining fiber.

$E_{0CCW}$ firstly passes through the polarization dependency loss (polarizer) $P_2$ at the input side lead part. $P_2$ is expressed as follows:

$$P_2 = \begin{pmatrix} 1 & 0 \\ 0 & \varepsilon_2 \end{pmatrix} \tag{73}$$

The light wave E3CCW passing through the polarizer $P_2$ is expressed as follows:

$$E_{3CCW} = P_2 E_{0CCW} \tag{74}$$

Using $E_{3CCW}$ and the formula (60), the light wave $E_{4CCW}$ inputted in the coupler with the CCW light making trips around the ring resonator is expressed as follows:

$$E_{4CCW} = F_{bCCW} \sum_{n=0}^{\infty} T_{CCW}^n C_{1l} C_{1r} E_{3CCW} \tag{75}$$

$$= (C_{1l} C_{1r})^{-1} T_{CCW} \sum_{n=0}^{\infty} T_{CCW}^n C_{1l} C_{1r} E_{3CCW}$$

$$= (C_{1l} C_{1r})^{-1} \sum_{n=0}^{\infty} T_{CCW}^{n+1} C_{1l} C_{1r} E_{3CCW}$$

$$= (C_{1l} C_{1r})^{-1} Z_{CCW} \Gamma_{CCW} Z_{CCW}^{-1} C_{1l} C_{1r} E_{3CCW}$$

Using $E_{3CCW}$ and $E_{4CCW}$, the light wave $E_{2CCW}$ outputted from the incident side coupler with the CCW light making trips around the ring resonator is expressed as follows:

$$E_{2CCW} = C_{11}(C_{1l} E_{3CCW} + C_{1r} E_{4CCW}) \tag{76}$$

In addition, using $E_{2CCW}$, the light wave $E_{5CCW}$ outputted from the ring resonator is expressed as follows:

$$E_{5CCW} = C_{2l} C_{2r} A(\phi)|_{z=L_1} E_{2CCW} \tag{77}$$

This light wave passes through the polarization dependency loss $P_4$ at the output side lead part. $P_4$ is expressed as follows:

$$P_4 = \begin{pmatrix} 1 & 0 \\ 0 & \varepsilon_4 \end{pmatrix} \tag{78}$$

The light wave $E_{dCCW}$ inputted in the light receiver is expressed as follows:

$$E_{dCCW} = P_4 E_{5CCW} \tag{79}$$

The light reception intensity of the CCW light observed by the light receiver is expressed as follows:

$$|E_{dCCW}|^2 = E_{dCCW}^\dagger E_{dCCW} \tag{80}$$

In the transmitter ring resonator, similar to the reflector ring resonator, the resonance characteristics of the CW light and the CCW light can be obtained by the formulae (71) and (80) by changing in the formulae (12) and (56).

Similar to the reflector ring resonator, the resonance points $\sigma_{CW}$ and $\sigma_{CCW}$ of the CW light and the CCW light are obtained respectively from the formulae (47) and (48), and the errors are calculated from the formula (49).

FIGS. 5A to 5F show the results of the numerical simulation of the errors when using the transmitter ring resonator.

Figure 5A:
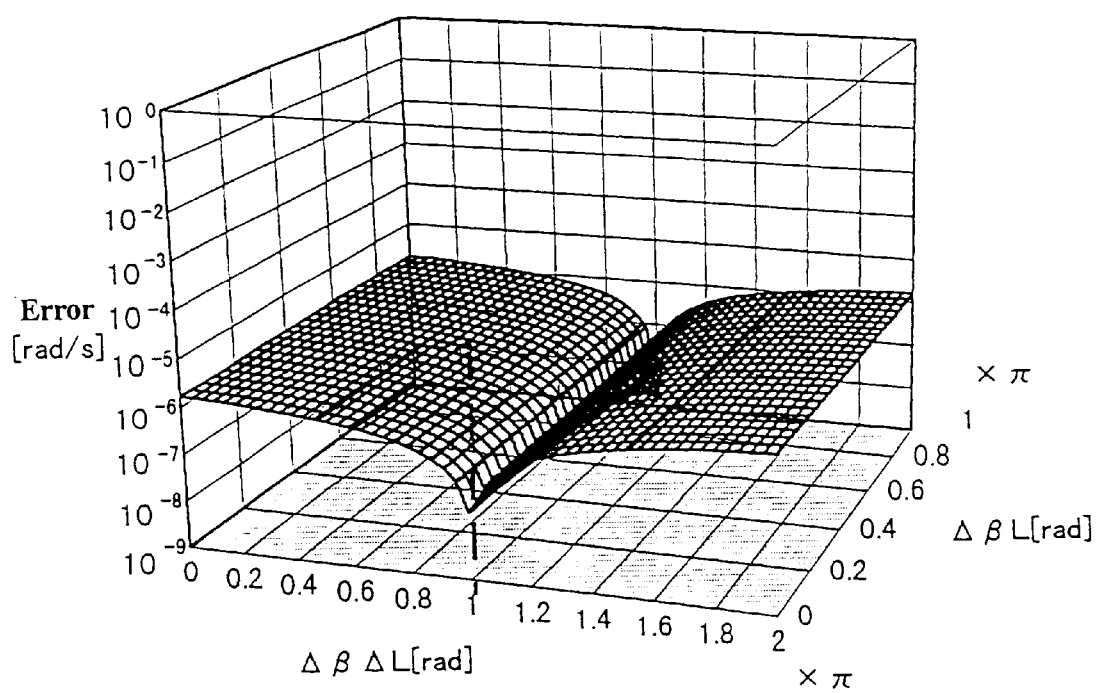
FIG. 5A is a graph showing the result of the numeral simulation of the errors when the transmitter ring resonator is used, and no polarization dependency is present in the output side coupler and the output side lead part.

FIG. 5A shows the result of the numerical simulation of the error when no polarization dependency is present at the output side coupler and the output side lead part, i.e., when $\kappa_{2x}=\kappa_{2y}=0.02$, $\gamma_{2x}=\gamma_{2y}=0.02$, $\theta_{R2}=0°$, and $\varepsilon_3=\varepsilon_4=1$. Other parameters include $\theta=89°$, $\kappa_{1x}=0.02$, $\kappa_{1y}=0.022$, $\gamma_{1x}=0.02$, $\gamma_{1y}=0.02$, and $\theta_{R1}=2°$, and $\varepsilon_1=\varepsilon_2=0.99$.

It is understood from the figure that, similar to the reflector ring resonator, the error is minimized by the relationship of the formula (A).

It is thus proven that the relationship of the formula (A) is generally established irrespective of the reflector ring resonator or the transmitter ring resonator.

Figure 5B:
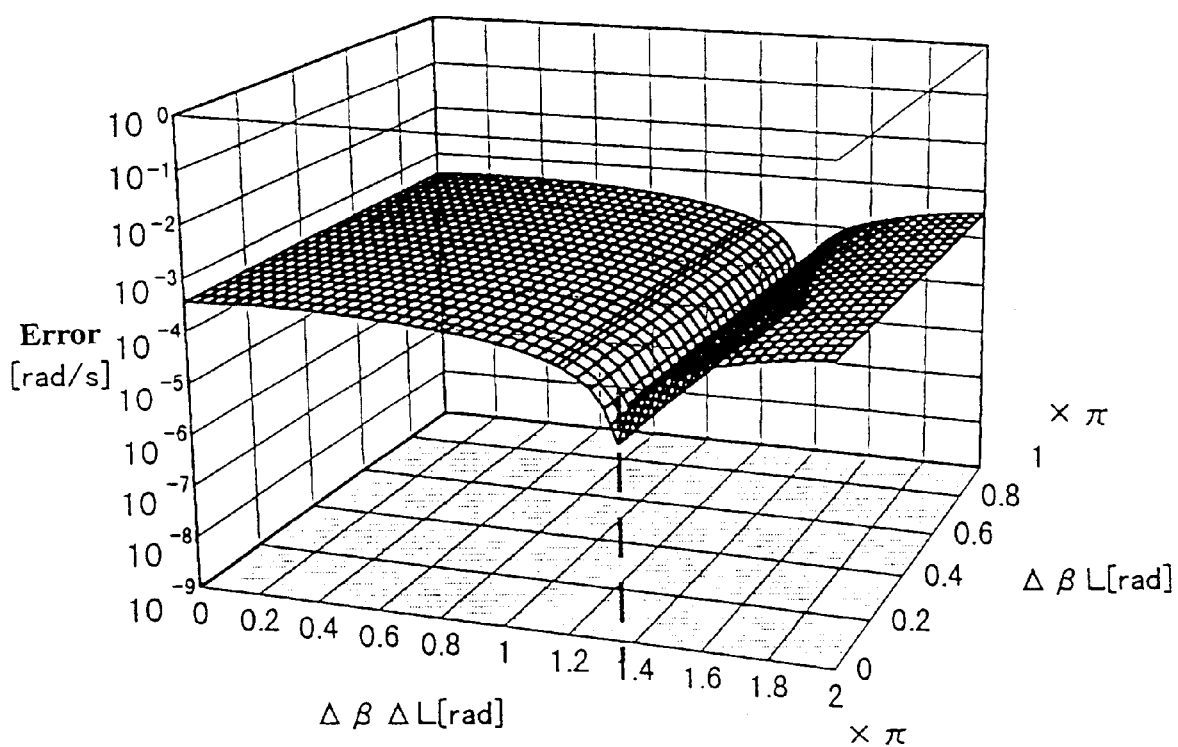
FIG. 5B is a graph showing the result of the numeral simulation of the errors when the transmitter ring resonator is used, and the polarization dependency is present in the output side coupler and the output side lead part.

FIG. 5B shows the analysis when the polarization dependency is present at both the output side coupler and the output side lead part.

The parameters include $\theta=89°$, $\varepsilon_1 \varepsilon_2=0.99$, $\kappa_{1x}=0.02$, $\kappa_{1y}=0.022$, $\gamma_{1x}=0.02$, $\gamma_{1y}=0.022$, $\theta_{R1}=2°$, $\varepsilon_3 \varepsilon_4=0.99$, $\kappa_{2x}=0.02$, $\kappa_{2y}=0.022$, $\gamma_{2x}=0.02$, $\gamma_{2y}=0.022$, and $\theta_{R2}=2°$.

Deviation is present from the relationship of the formula (A). This means that generality of the formula (A) is maintained when no polarization dependency is present or the polarization dependency is small at the output side coupler or the output side lead part.

In order to remove the effect of the polarization dependency at the output side coupler and the output side lead part, it is necessary to regulate the optimum position of the output side coupler while maintaining the relationship of the formula (A). It will be described below that the relationship of the formula (A) is applicable to the transmitter ring resonator if the length of the input side coupler and the output side coupler is integral multiple of $\pi$.

Figure 5C:
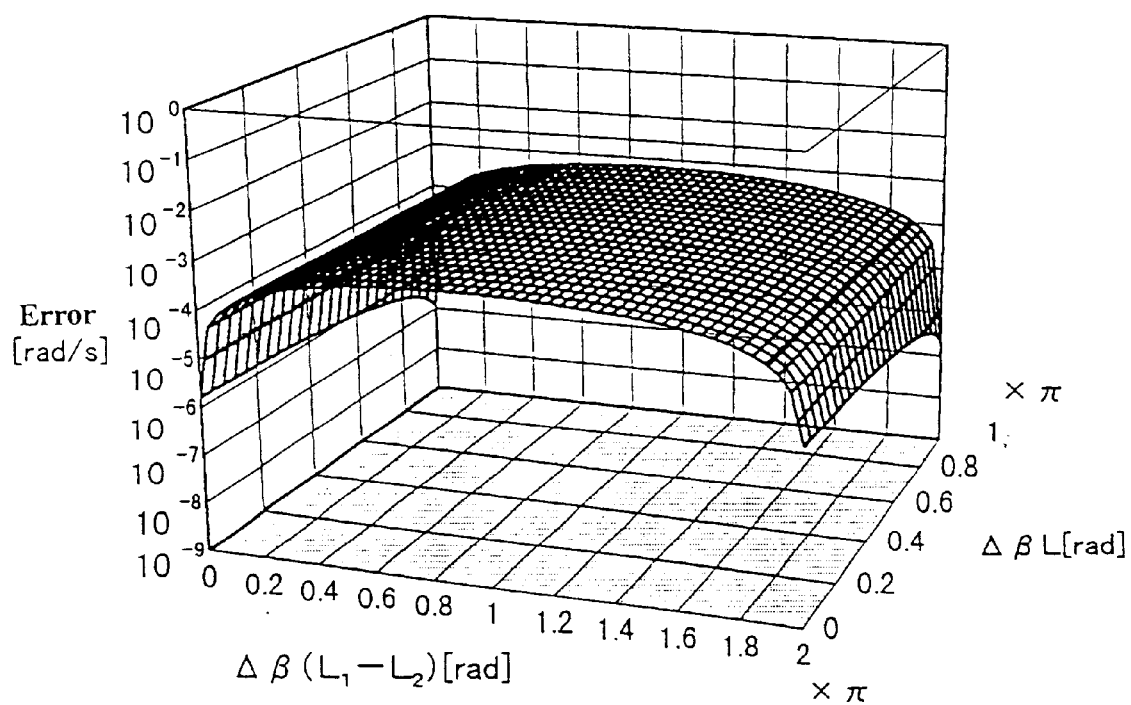
FIG. 5C is a graph showing the result of the numeral simulation of the errors when the transmitter ring resonator is used; i.e., the result to $\Delta\beta L$ and $\Delta\beta(L_1-L_2)$ when the polarization dependency is present in the output side coupler and the output side lead part, and $\Delta\beta L_3=\pi$.

FIG. 5C, similar to FIG. 5B, shows the analysis in which the polarization dependency is present at both the output side coupler and the output side lead part. The same parameters as those in FIG. 5B are included. However, the analysis was implemented for $\Delta\beta L$ and $\Delta\beta(L_1-L_2)$ with $\Delta\beta L_3=\pi$. It is understood from the figure that the error is minimized with $\Delta\beta(L_1-L_2)=2n\pi$ (n: integer), and this relationship agrees with the relationship of the formula (A) with respect to the sum and the difference of two portions of the optical fiber divided by the incident side coupler and the 90° splice point.

Figure 5D:
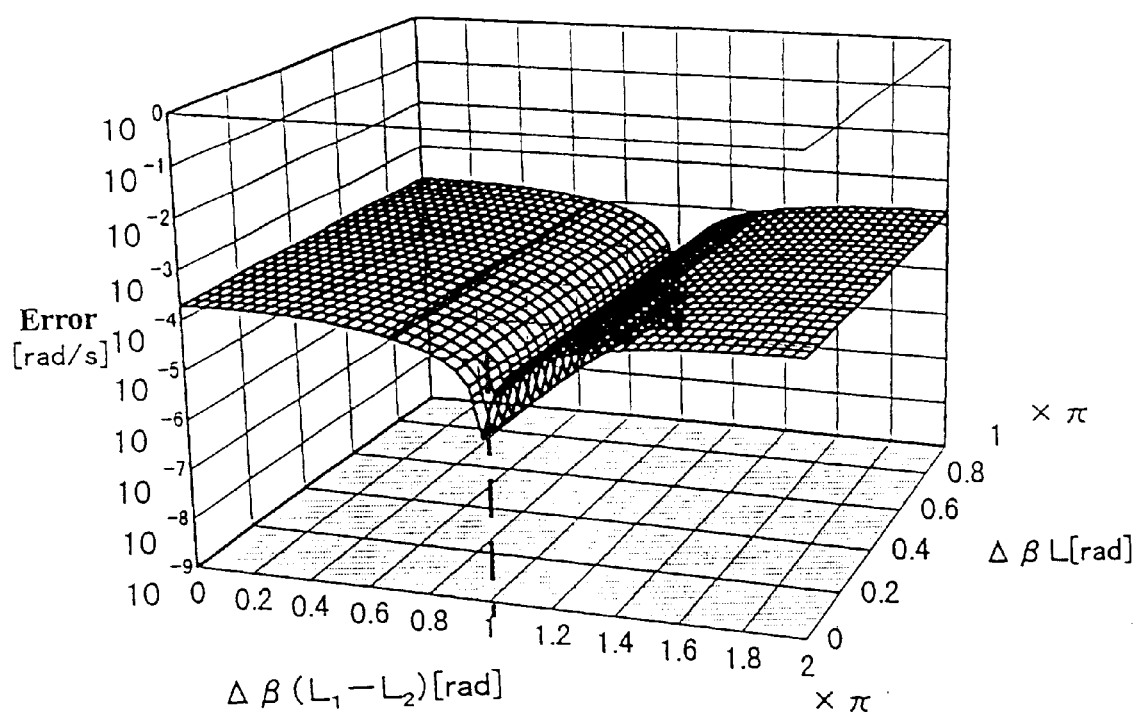
FIG. 5D is a graph showing the result of the numeral simulation of the errors when the transmitter ring resonator is used; i.e., the result to $\Delta\beta L$ and $\Delta\beta(L_1-L_2)$ when the polarization dependency is present in the output side coupler and the output side lead part, and $\Delta\beta L_3=2\pi$.

FIG. 5D, similar to FIGS. 5B and 5C, shows the analysis in which the polarization dependency is present at both the output side coupler and the output side lead part. The same parameters as those in FIGS. 5B and 5C are included. However, the analysis was implemented for $\Delta\beta L$ and $\Delta\beta(L_1-L_2)$ with $\Delta\beta L_3=2\pi$.

It is understood from the figure that the error is minimized with $\alpha\beta(L_1-L_2)=\pi+2n\pi$ (n: integer), and this relationship agrees with the relationship of the formula (A) with respect to the sum and the difference of two portions of the optical fiber divided by the incident side coupler and the 90° splice point.

As described above, the error induced by the polarization fluctuation if the following formulae are satisfied:

$$\Delta\beta\Delta L=\pi+2n\pi[\text{radian}] \quad (n: \text{integer})$$

and $$\Delta\beta L_3=m\pi[\text{radian}] \quad (m: \text{integer}) \tag{B}$$

where $\Delta L=L_1-(L_2+L_3)$

The error induced by the polarization fluctuation can be reduced by setting AL and $L_3$ so as to satisfy the relationship. This is a method of reliably reducing the error while maintaining the relationship of the formula (A) when using the transmitter ring resonator.

(Length of Lead Part)

In the above analysis, the light wave incident in the ring resonator is assumed to be the linearly polarized wave. However, if the light wave incident in the ring resonator is not linearly polarized wave, the result of the analysis is different. The error in this condition can be obtained by replacing the formulae (32) and (63) by the formula (82), and the formulae (63) and (72) by the formula (83), respectively.

$$E_{0CW}=\begin{pmatrix}\cos(\theta_{iCW})\\ \sin(\theta_{iCW})\exp(i\phi_{1CW})\end{pmatrix} \tag{82}$$

$$E_{0CCW}=\begin{pmatrix}\cos(\theta_{iCCW})\\ \sin(\theta_{1CCW})\exp(i\phi_{iCCW})\end{pmatrix} \tag{83}$$

where $\phi_{iCW}$ and $\phi_{iCCW}$ denote the phase difference between the light wave propagating along X-axis and the light wave propagating along Y-axis.

Figure 6:
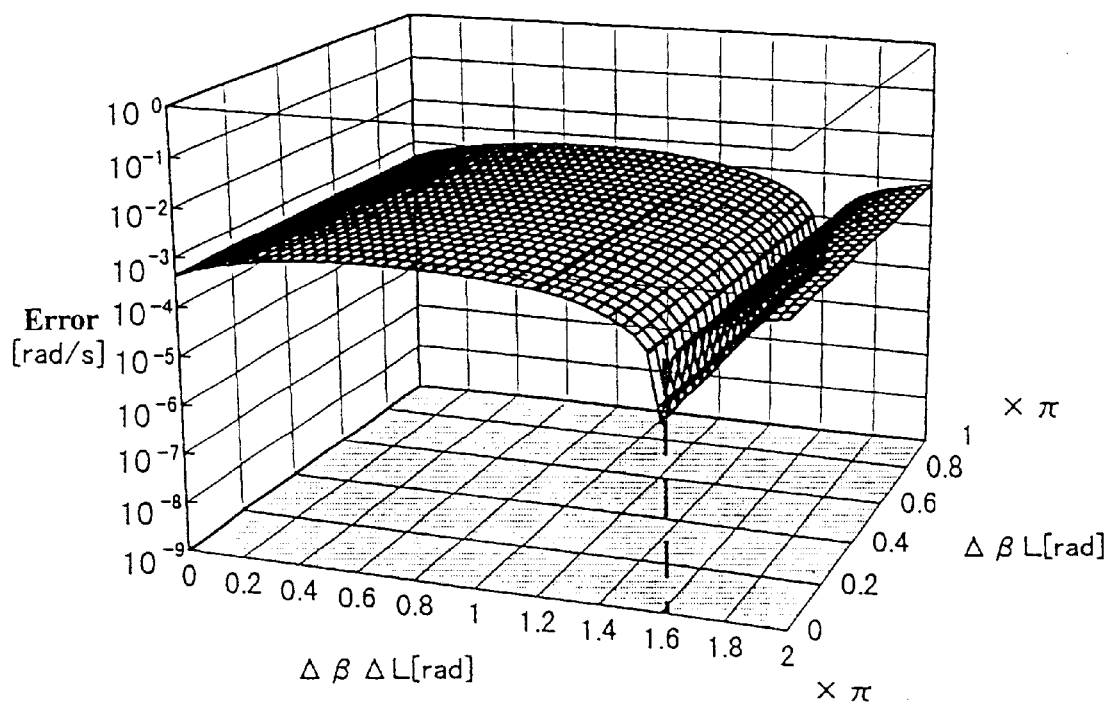
FIG. 6 is a graph showing the result of the numerical simulation of the errors in the reflector ring resonator model when the incident polarization is deviated from the straight polarization.

FIG. 6 shows the result of the numerical simulation of the error when the incident polarized wave is deviated from the linearly polarized wave in the reflector ring resonator model. Here, $\phi_{iCW}=0$ and $\phi_{iCCW}=0.5\pi$. Other parameters include $\theta=90°$, $\epsilon_1=\epsilon_2=0.01$, $\kappa_x=0.02$, $\kappa_y=0.022$, $\gamma_x=0.02$, $\gamma_y=0.022$, and $\theta_R=0°$.

It is understood from the figure that the value of $\Delta\beta\Delta L$ with the error minimized thereat is deviated from the relationship of the formula (A) due to the deviation from the linearly polarized wave, and it is thus necessary that the light wave incident in the ring resonator is constantly the linearly polarized wave in order to obtain the effect of reducing the error correctly by the relationship of the formula (A).

If the incident light is not the linearly polarized wave, the relationship of the formula (A) is corrected accordingly, and a new result is obtained, in which the following relationship minimizes the error:

$$\Delta\beta\Delta L=(\pi+\delta)+2n\pi[\text{radian}] \quad (n: \text{integer}) \tag{A)'}$$

where $\delta$ is the displacement for correction.

As described above, it is understood from the analysis in FIGS. 3A to 6, that the error can be considerably reduced if $\Delta L$ is set to satisfy the relationship of the formula (A) (or of the formula (A)').

(Control of $\Delta\beta\Delta L$)

From the above results, concerning the error generated by the polarization dependency loss, the error is not dependent on $\Delta\beta L$ but dependent on only $\Delta\beta\Delta L$ if the angle of rotation at the splice point is close to 90°. Making use of this nature, it is possible to maintain the relationship of the formula (A) irrespective of the change in $\Delta\beta L$ by controlling the sensing loop.

Further, as described above, the deviation from $\Delta\beta\Delta L=\pi+2n\pi[\text{radian}]$ (n: integer) can be generated in the relationship of the formula (A) due to the fluctuation in the polarized condition of the incident light and other factors not included in the model. Even in such a case, the error can be corrected to be minimum irrespective of the change in $\Delta\beta L$ by controlling the length of $\Delta L$.

This is a method of controlling $\Delta L$ so that the error is minimized by the feedback control as described below.

For example, the magnitude of the error is dependent on the depth of modulation of the bias modulation to detect the resonance point, i.e., $\Delta\xi_{CW}$ and $\Delta\xi_{CCW}$ in the formulae (47) and (48).

Figure 5E:
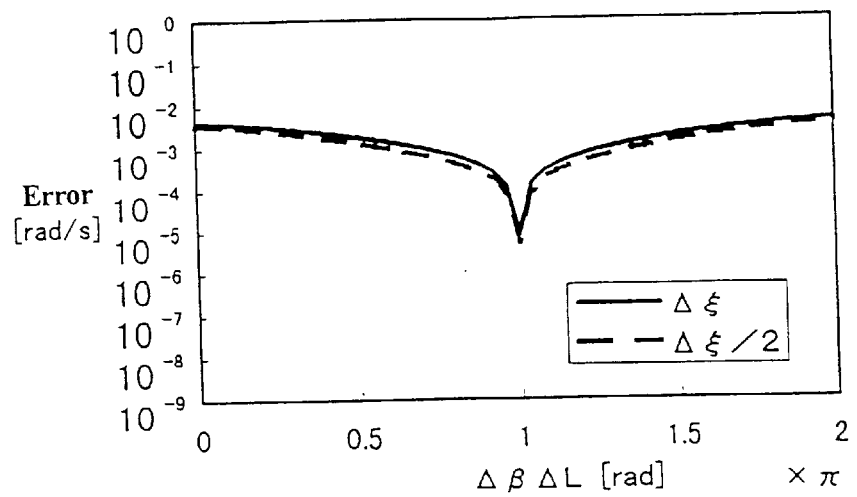
FIG. 5E is a graph showing the result of the numerical simulation of the errors for two different depths of modulation, and shows the comparison of the errors to $\Delta\beta\Delta L$.
Figure 5F:
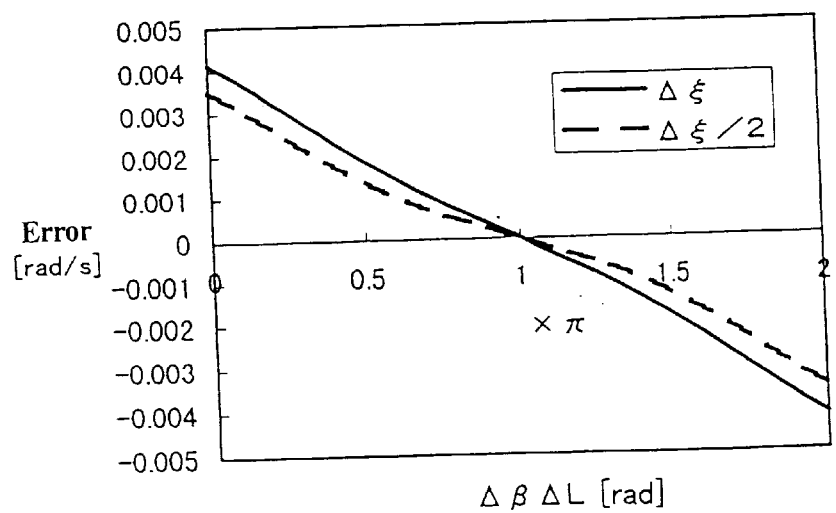
FIG. 5F is a graph showing the result of the numerical simulation of the errors for two different depths of modulation, and shows the comparison of the errors to $\Delta\beta\Delta L$ taking into consideration the sign thereof.

FIG. 5E shows an example of comparison between a case in which the depth of modulation set to be half width at half maximum at the resonance point is used ($\Delta\xi$) and a case in which the depth of modulation set to one half ($\Delta\xi/2$) is used when the error to $\Delta\beta\Delta L$ is $\Delta\beta L=2m\pi$ (m: integer). FIG. 5F shows the comparison taking into consideration the sign of these errors.

FIG. 5F shows that, when the relationship of the formula (A) (or the formula (A)') is satisfied, the error is minimized irrespective of the depth of modulation, and for example, if two different depths of modulation are alternately switched at a predetermined frequency and applied, the signal to indicate the deviation from the value to minimize the error of $\Delta\beta\Delta L$ appears in the gyro output at the switching frequency.

Figure 21:
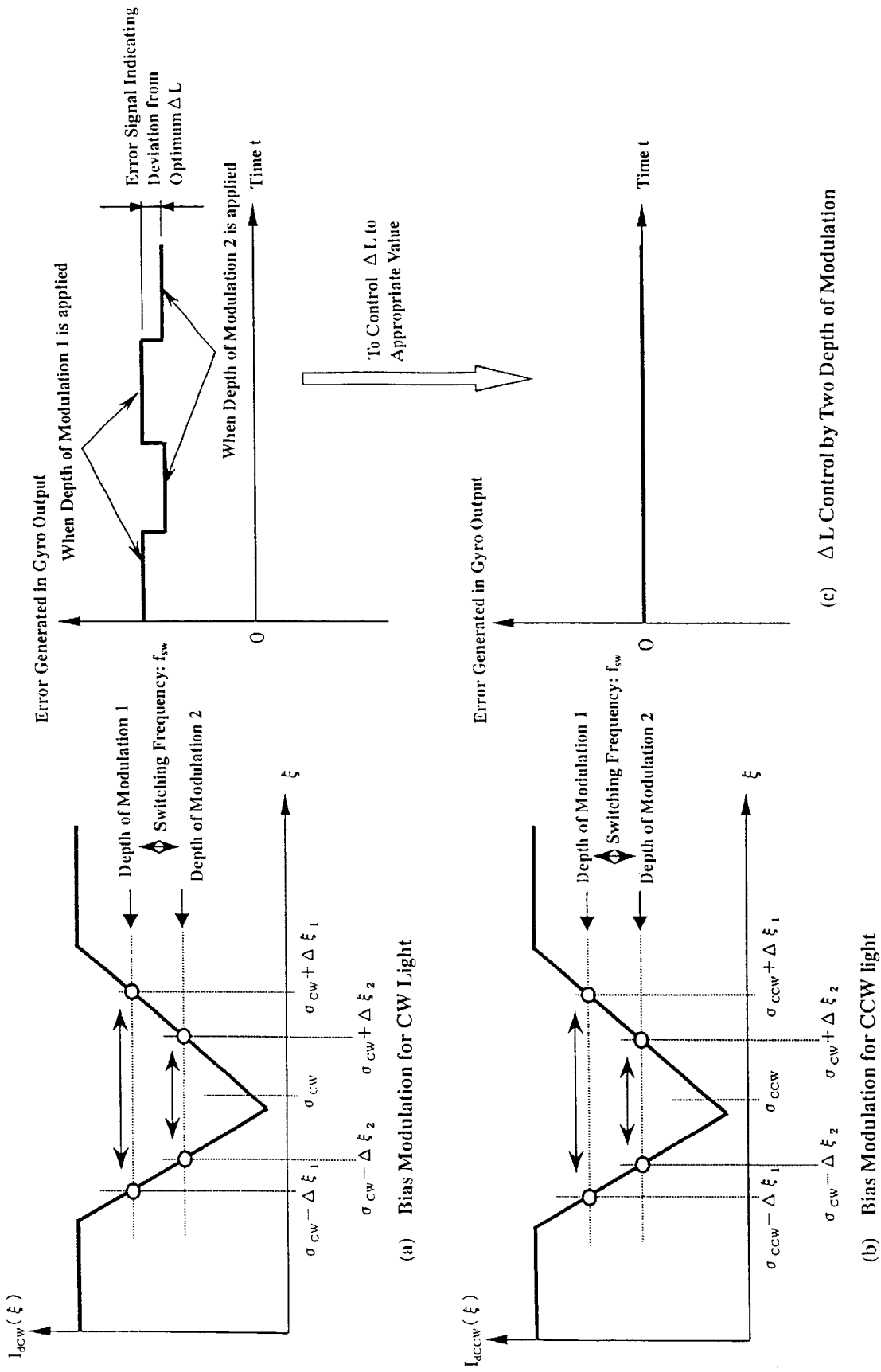
FIG. 21 is a conceptual view of removing the errors using two depths of modulation.

FIG. 21 shows the conceptual view of eliminating the error by this method. The bias modulation to the CW light and the bias modulation to the CCW light are achieved by two kinds of the depth of modulation, and applied alternately at the predetermined switching frequency ($f_{sw}$) (which is lower than the bias modulation frequency). The gyro output when the depth of modulation 1 is applied and the gyro output when the depth of modulation 2 is applied are different from each other in the generated error, and the error signal showing the deviation from the optimum value of $\Delta L$ is generated at the switching period of the depth of modulation. This means that the error signal for the control is given. Using this error signal, $\Delta L$ is fed-back to control $\Delta L$ to an optimum value so that the error of the gyro output is minimized.

EXAMPLE

The example of the present invention is described based on the above result of the analysis.

Figure 7:
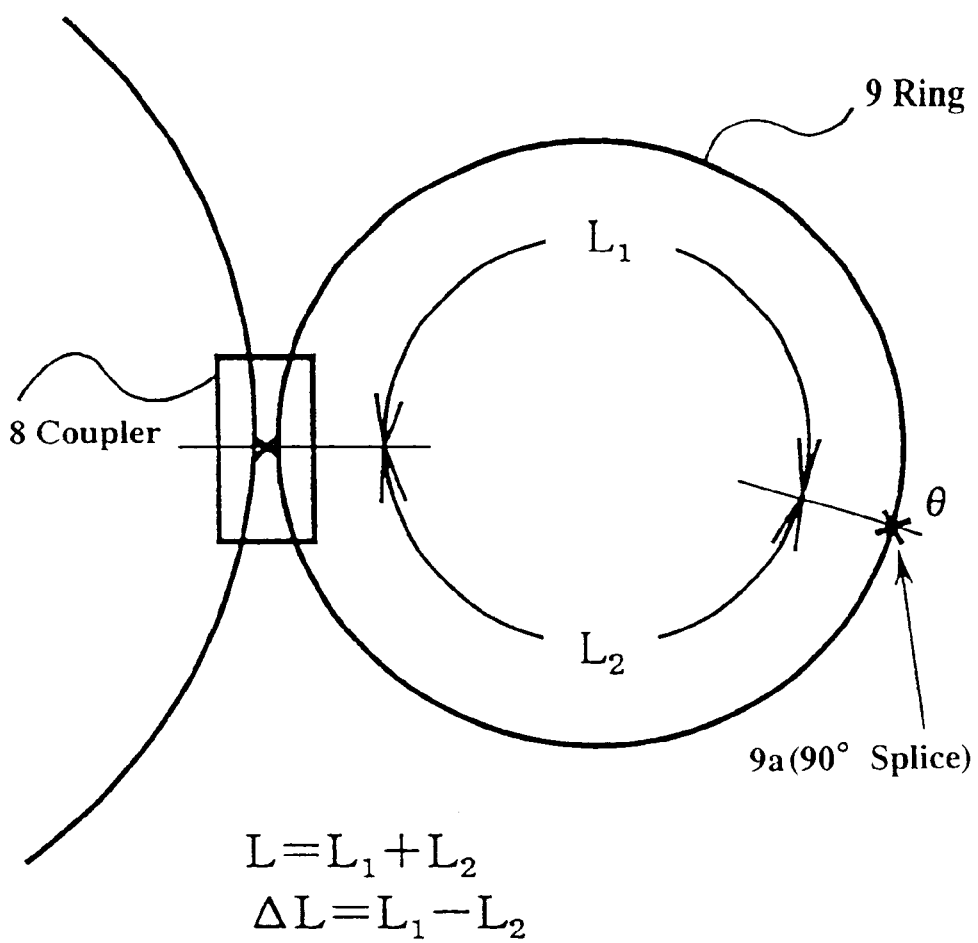
FIG. 7 shows a first embodiment of a resonator fiber optic gyro in accordance with the present invention, which is the reflector ring resonator.

FIG. 7 shows a first embodiment of the resonator fiber optic gyro with the method in accordance with the present invention applied thereto, and the reflector ring resonator has the 90° splice.

When measuring the non-reciprocal effect of rotation, etc., $\Delta L$ is set to satisfy the relationship between the difference $\Delta L$ between the lengths $L_1$ and $L_2$ of two portions of the waveguide divided at a polarization-rotating point 9a in the coupler 8 and the ring resonator and the difference $\Delta \beta$ in the propagation constant between two polarization axes of the waveguide using the nature that the difference induced by the polarization fluctuation is minimized if $\Delta \beta \Delta L = \pi + 2n\pi$ [radian] (n: integer), or close thereto. The error induced by the polarization fluctuation can be reduced thereby.

Figure 8:
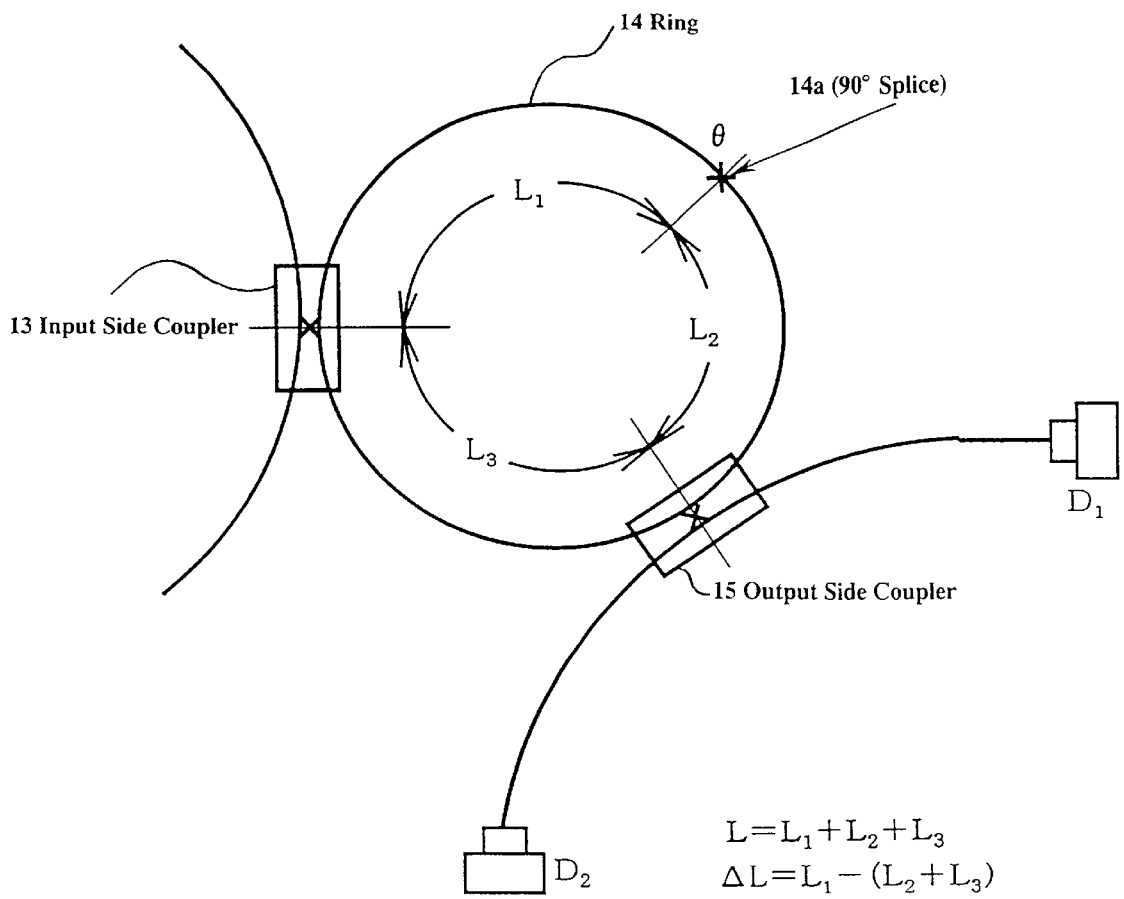
FIG. 8 shows a second embodiment of the resonator fiber optic gyro in accordance with the present invention, in which the position of the output side coupler of the transmitter ring resonator is optimized.
Figure 9:
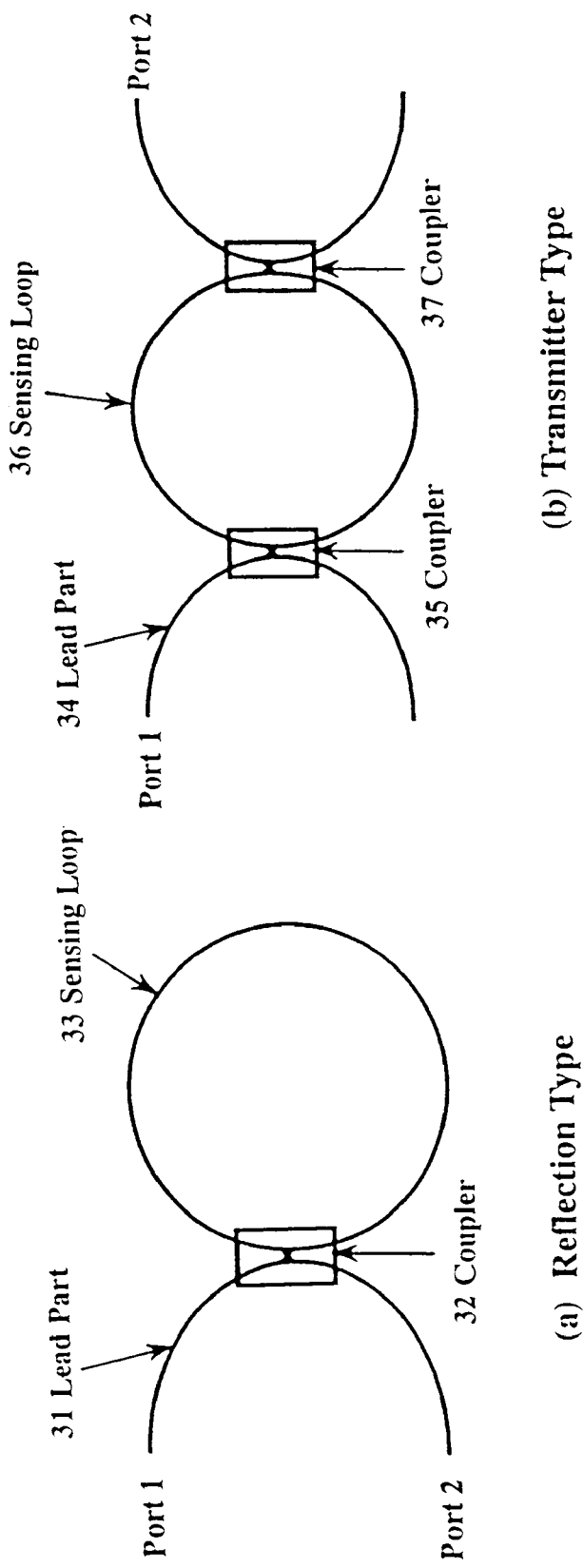
FIG. 9 shows the reflector and transmitter ring resonators.
Figure 10:
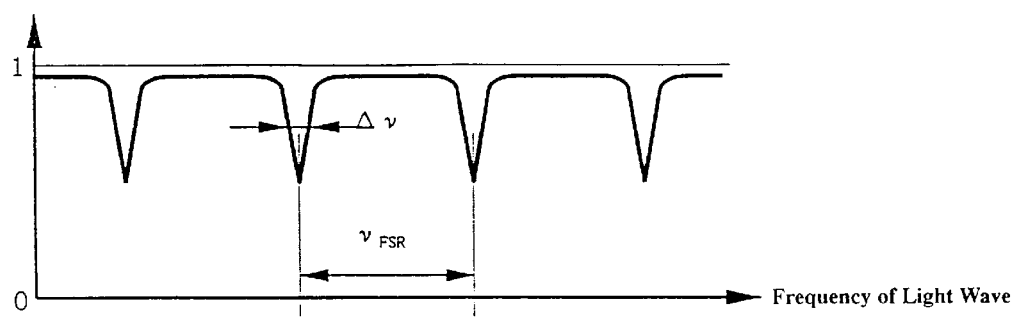
FIG. 10 shows the resonance characteristic to the frequency of the light wave of the ring resonator in FIG. 9.
Figure 10:
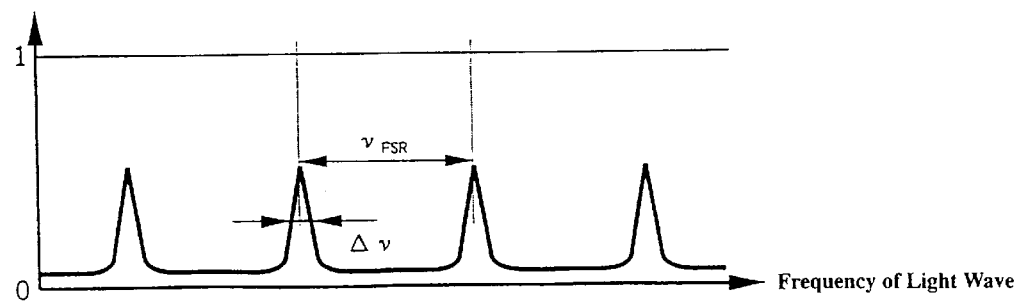
Figure 11:
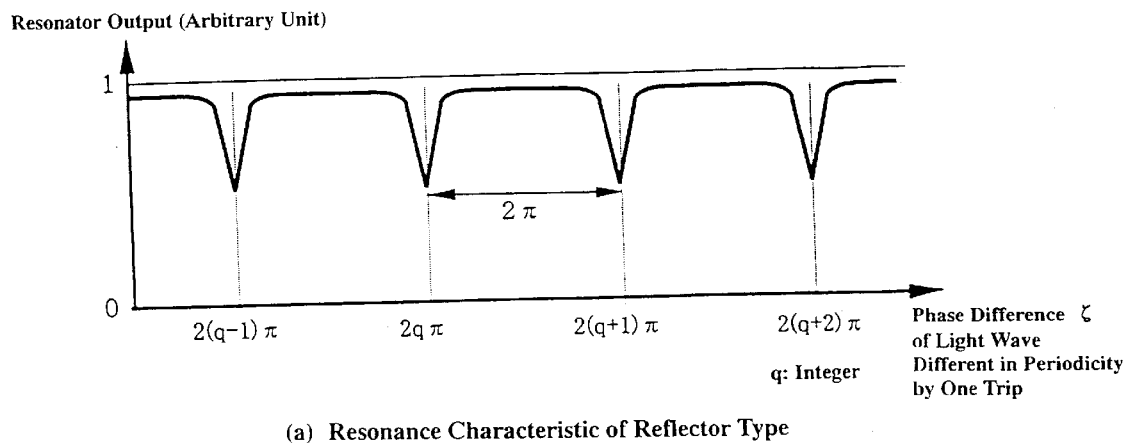
FIG. 11 shows the resonance characteristic to the phase difference of the light waves different in periodicity by one trip of the ring resonator in FIG. 9.
Figure 11:
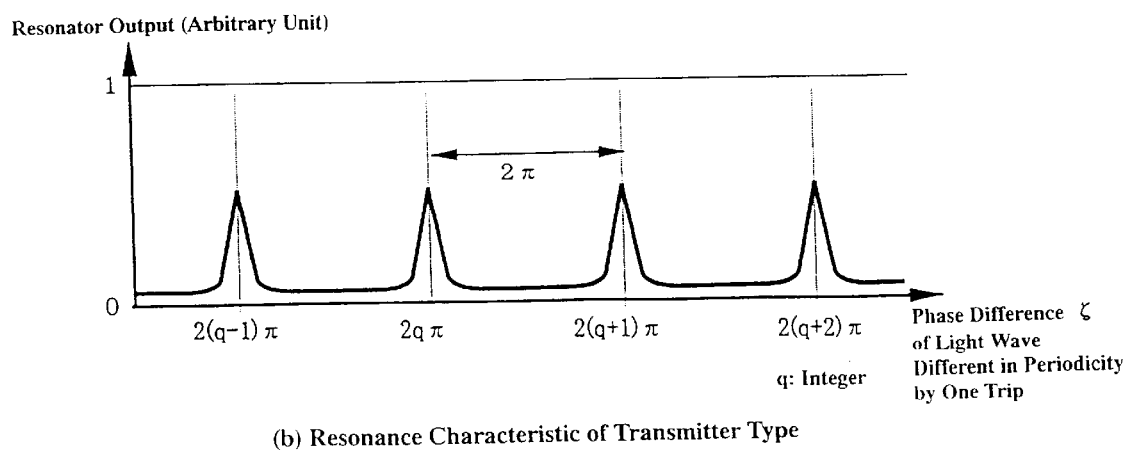

FIG. 8 shows a second embodiment of the resonator fiber optic gyro with the method in accordance with the present invention applied thereto, and the transmitter ring resonator has the 90° splice.

When measuring the non-reciprocal effect of rotation, etc., $\Delta L$ and $L_3$ are set to satisfy the relationship between the difference $\Delta L$ between the lengths $L_1$ from the input side coupler 13 to a polarization-rotating point 14a, and the length ($L_2+L_3$) from the polarization-rotating point 14a to the input side coupler 13 via the output side coupler 15, the length $L_3$ between the input side coupler 13 and the output side coupler 15, and the difference $\Delta \beta$ in the propagation constant between two polarization axes of the waveguide using the nature that the difference induced by the polarization fluctuation is minimized if $\Delta \beta \Delta L = \pi + 2n\pi$ [radian] (n: integer), or close thereto, and $\Delta \beta L_3 = m\pi$ [radian] (m: integer), or close thereto, where $L_1$, $L_2$ and $L_3$ are the lengths of three portions of the waveguide to be divided by the input side coupler 13 (the first coupler) in which the light wave emitted from the laser beam source reaches first, the polarization-rotating point 14a in the ring resonator, and the output side coupler (the second coupler). The error induced by the polarization fluctuation can be reduced thereby.

The embodiments of the waveguide of the optical fiber are described above, the present invention is, of course, applicable to any waveguide other than those of the optical fiber.

Figure 22:
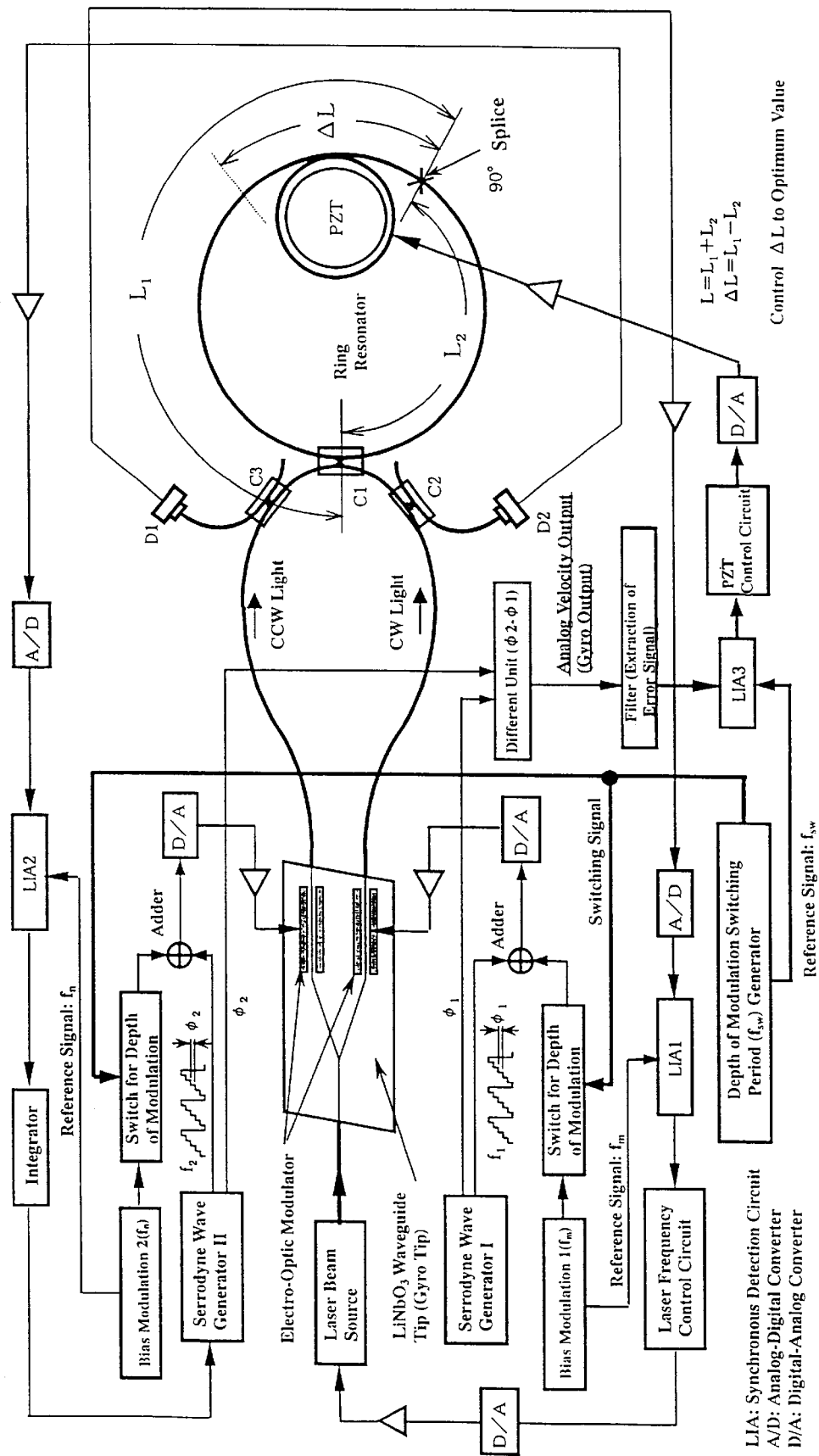
FIG. 22 is a block diagram (reflector type) of R-FOG applying the control of $\Delta\beta\Delta L$.

FIG. 22 shows a third embodiment of the resonator fiber optic gyro with the J method in accordance with the present invention applied thereto. The configuration of the R-FOG using the reflector ring resonator having the 90° splice is shown in the figure.

In measuring the non-reciprocal effect of the rotation, etc., a fiber is coiled around a columnar PZT (piezoelectric element) to control the length so that the difference $\Delta L$ between the lengths $L_1$ and $L_2$ of two portions of the waveguide (the optical fiber) divided by the coupler (Cl) and the 90° splice point in the ring resonator is optimized to reduce the error.

Figure 12:
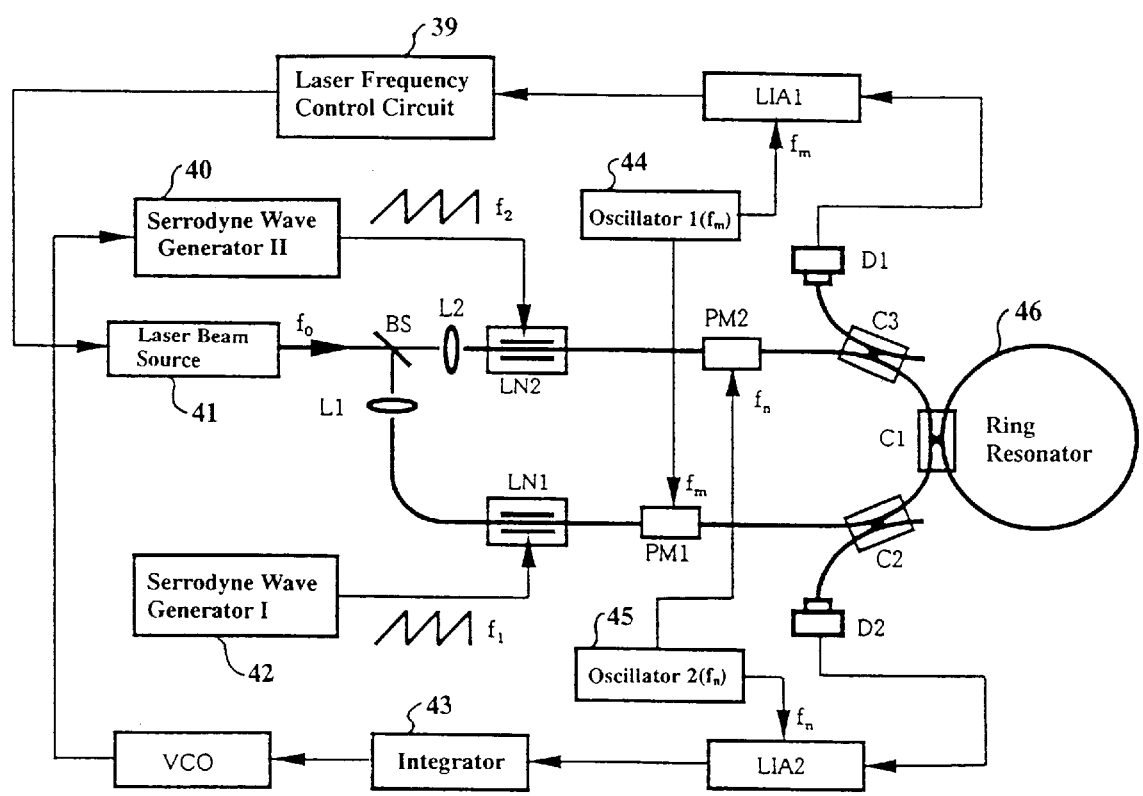
FIG. 12 is a block diagram showing the configuration of the reflector-resonator fiber optic gyro.
Figure 13:
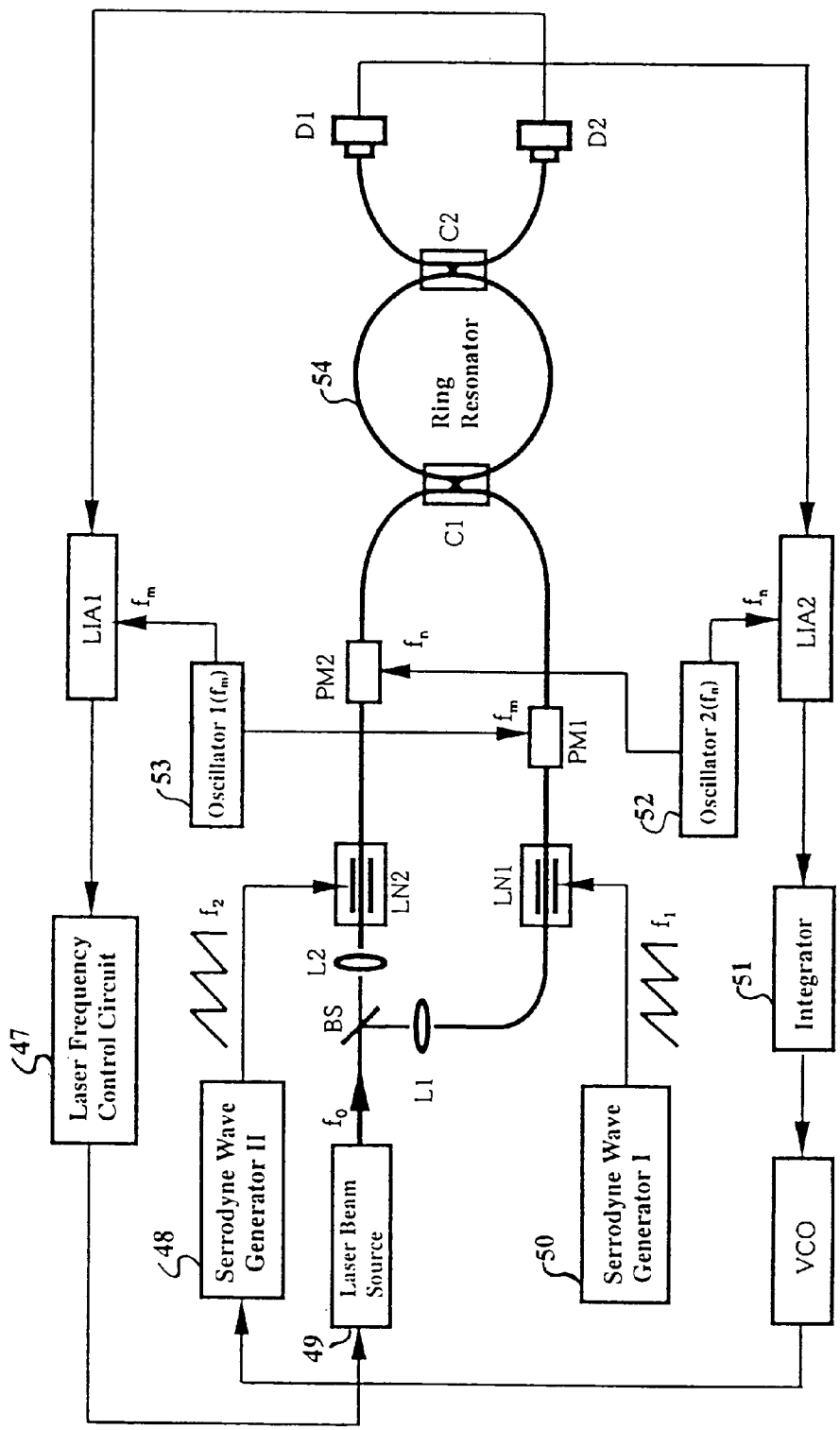
FIG. 13 is a block diagram showing the configuration of the transmitter-resonator fiber optic gyro.
Figure 14:
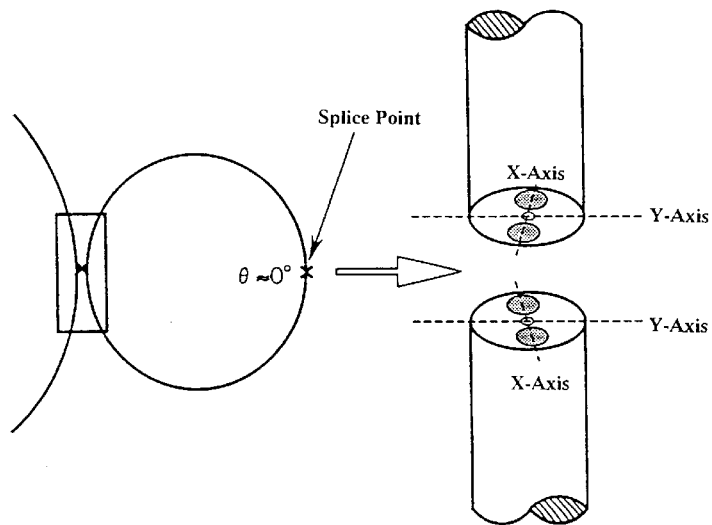
FIG. 14 shows the ring resonator using a polarization maintaining fiber and the splice position.
Figure 15:
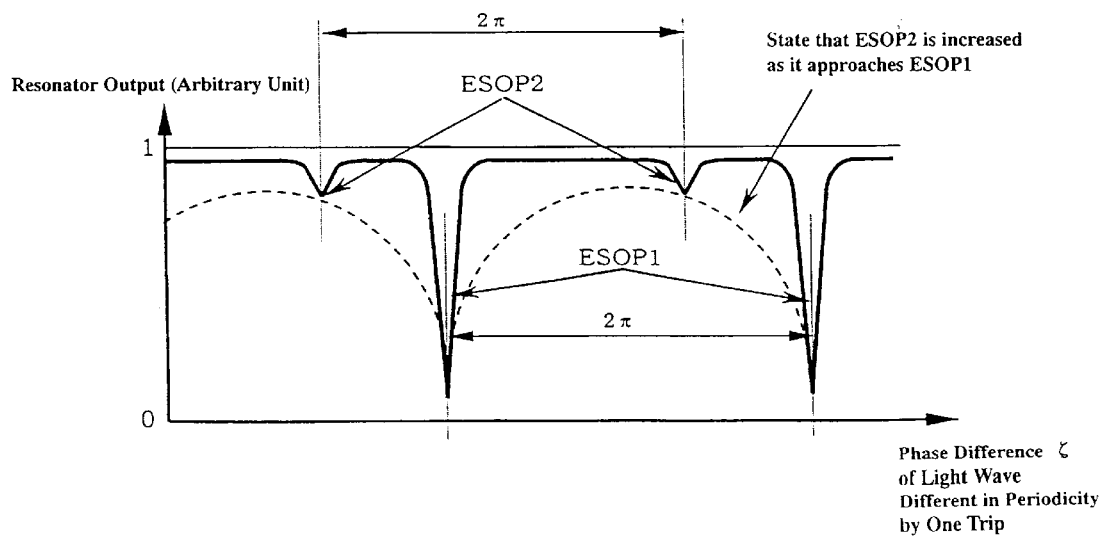
FIG. 15 is a conceptual view showing the Eigenstate of Polarization (ESOP)
Figure 16:
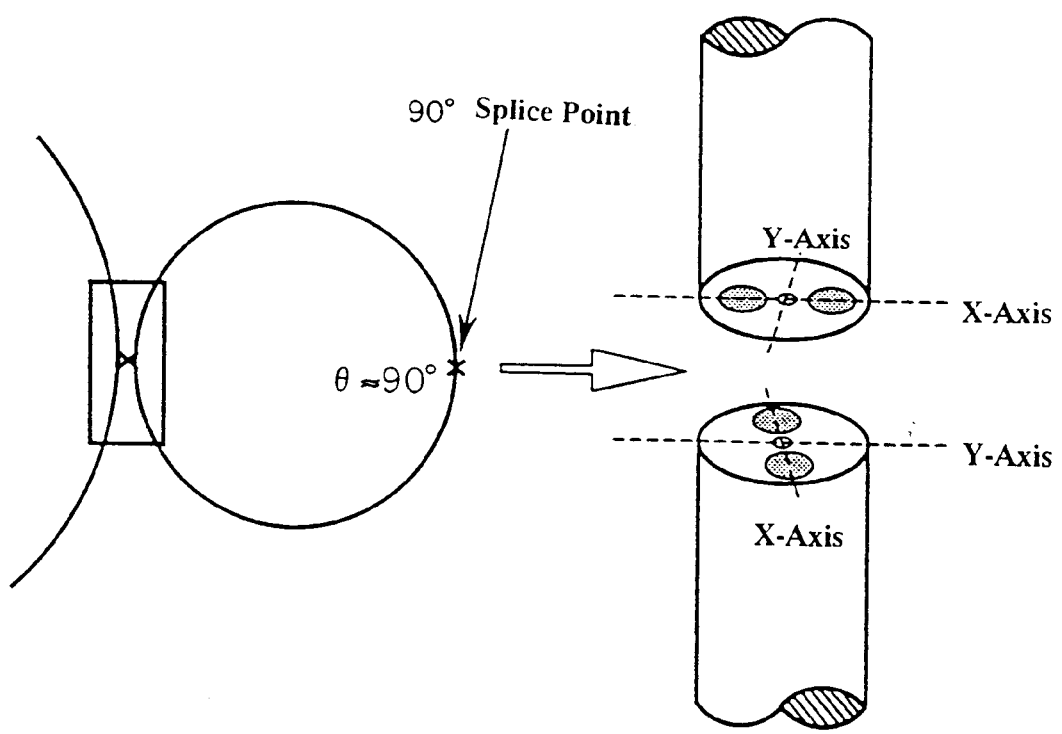
FIG. 16 is a schematic representation explaining the 90° splice in the ring resonator using the polarization maintaining fiber.
Figure 17:
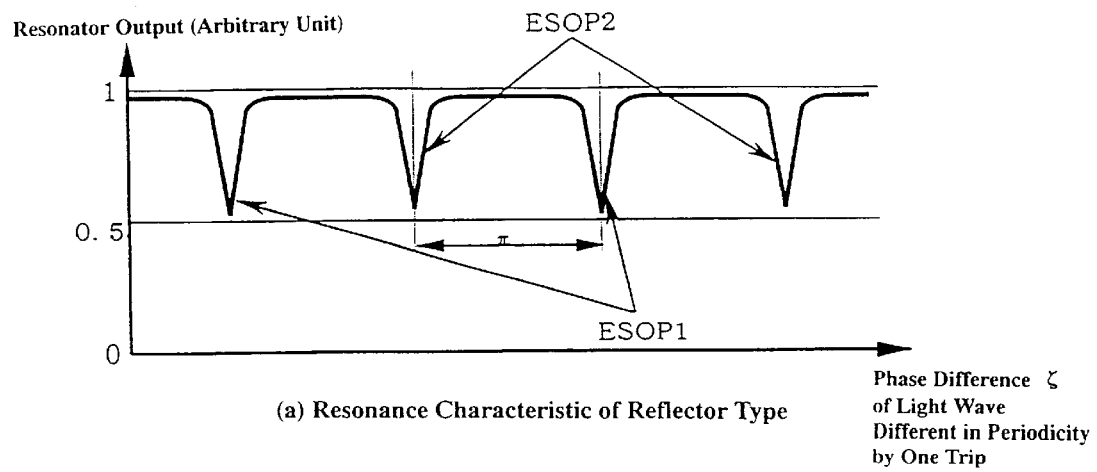
FIG. 17 shows the resonance characteristic when the polarization is rotated by 90° in the ring resonator.
Figure 17:
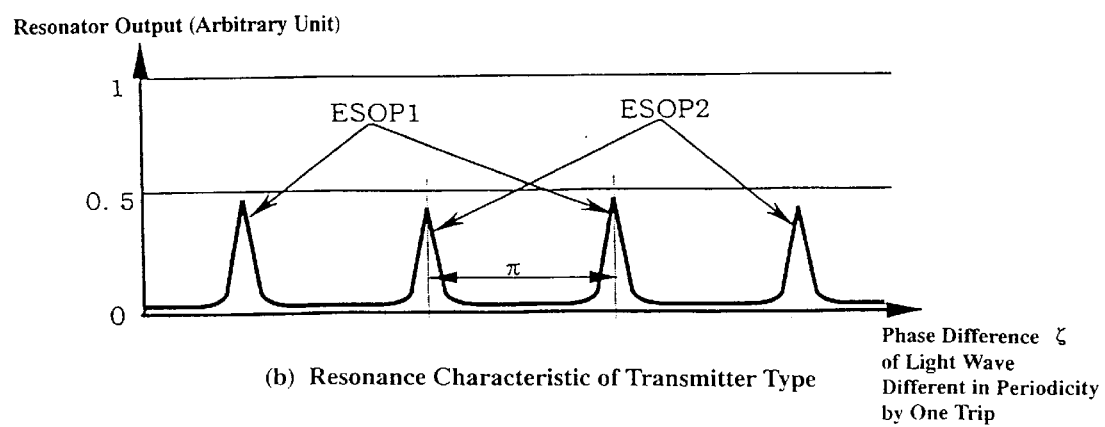
Figure 18:
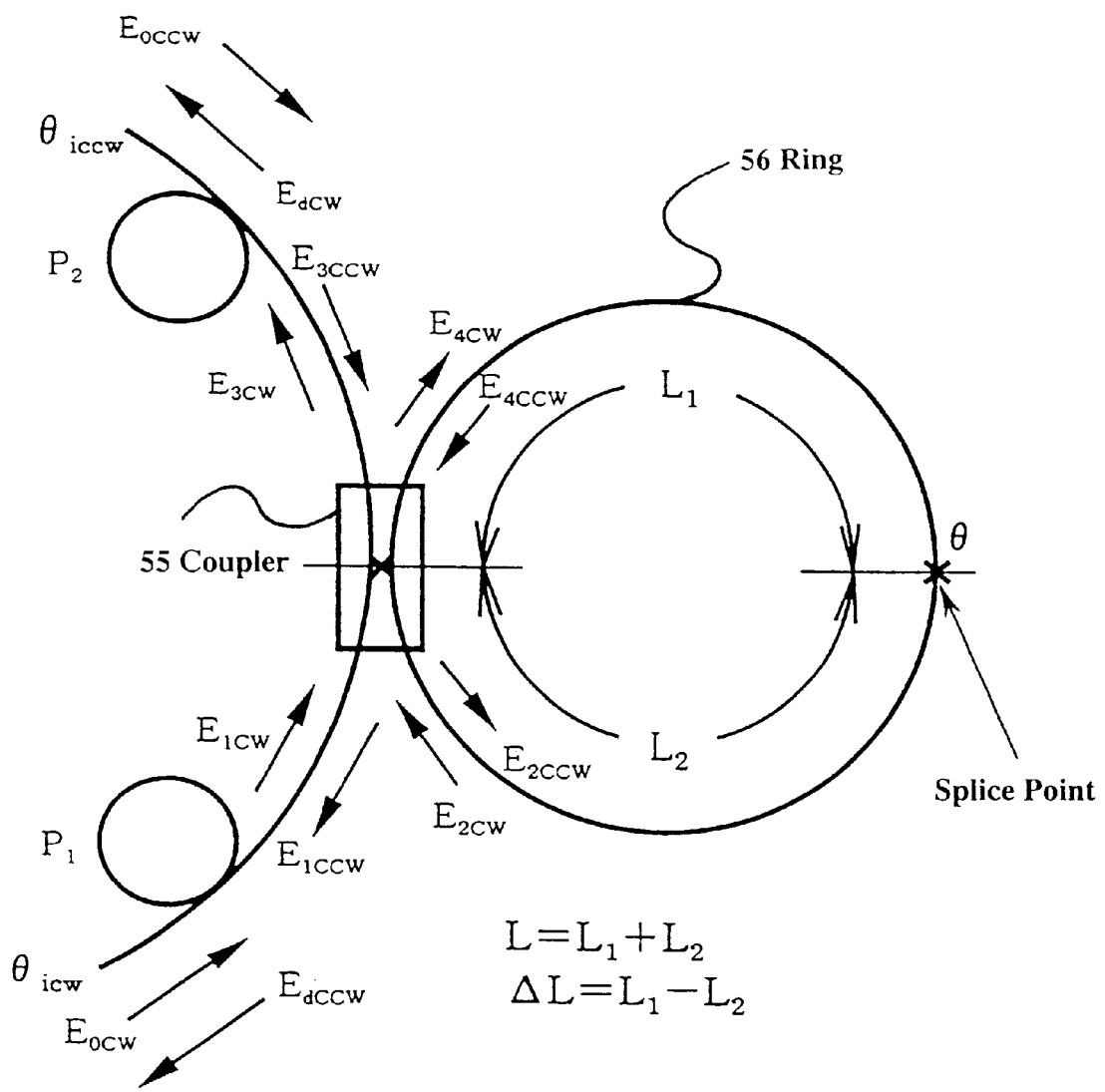
FIG. 18 shows the ring resonator (reflector type) using the polarization maintaining fiber.
Figure 19:
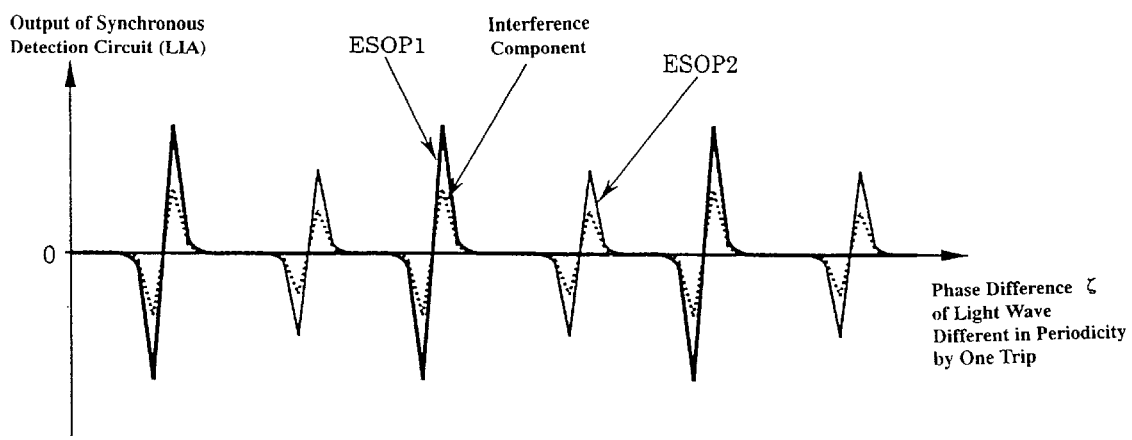
FIG. 19 is a graph explaining ESOP1, ESOP2 and interference component in the resonance differential characteristic.
Figure 20:
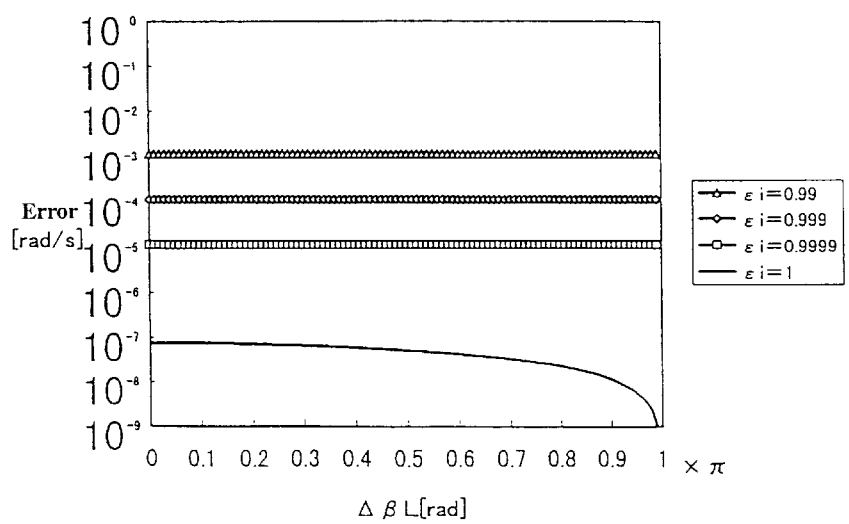
FIG. 20 shows the rapid increase of the errors due to the slight polarization dependency.

The following parts are added to the signal processing in the general configuration (FIG. 12).

Two kinds of depth of modulation can be generated in both the bias modulation to the CW light and the bias modulation to the CCW light, the switching signal of the frequency $f_{SW}$ is generated by a depth of modulation switching period generator to switch the depth of modulation in a depth of modulation switching unit.

In the present embodiment, most of the processing are implemented through the digital logic; however, it matters little in the meaning of the principle whether the processing is implemented in an analog manner or in a digital manner. In addition, regarding the bias modulation, the binary frequency shift through the "digital serrodyne modulation" in Literature 1 may be implemented at a predetermined changing frequency.

The serrodyne wave in the figure is used to realize the closed loop, and the means is not limited thereto. In this embodiment, the digitally generated serrodyne wave and the bias modulated wave are added, and inputted in an electro-optic modulator on a $LiNbO_3$ waveguide tip (gyro tip). The step-like digital serrodyne wave (digital phase ramp) in which the time for the light wave to make one turn around the resonator is the width of the unit step as introduced in Literature 1, may be inputted. In this condition, the heights ($\phi 1$ and $\phi 2$) of one step correspond to the frequencies ($f_1$ and $f_2$) of the serrodyne wave, and the angular velocity output (the gyro output) can be obtained from the difference therebetween.

The angular velocity output includes the error signal showing the deviation from the optimum value of $\Delta L$ at the depth of modulation switching frequency $f_{SW}$, and the error component is detected by extracting the error signal by a filter, and implementing the synchronous detection by LIA3. The voltage is applied to the PZT so that the error component becomes zero, the fiber length is controlled, and the feedback control is implemented so that $\Delta L$ is optimized.

Figure 23:
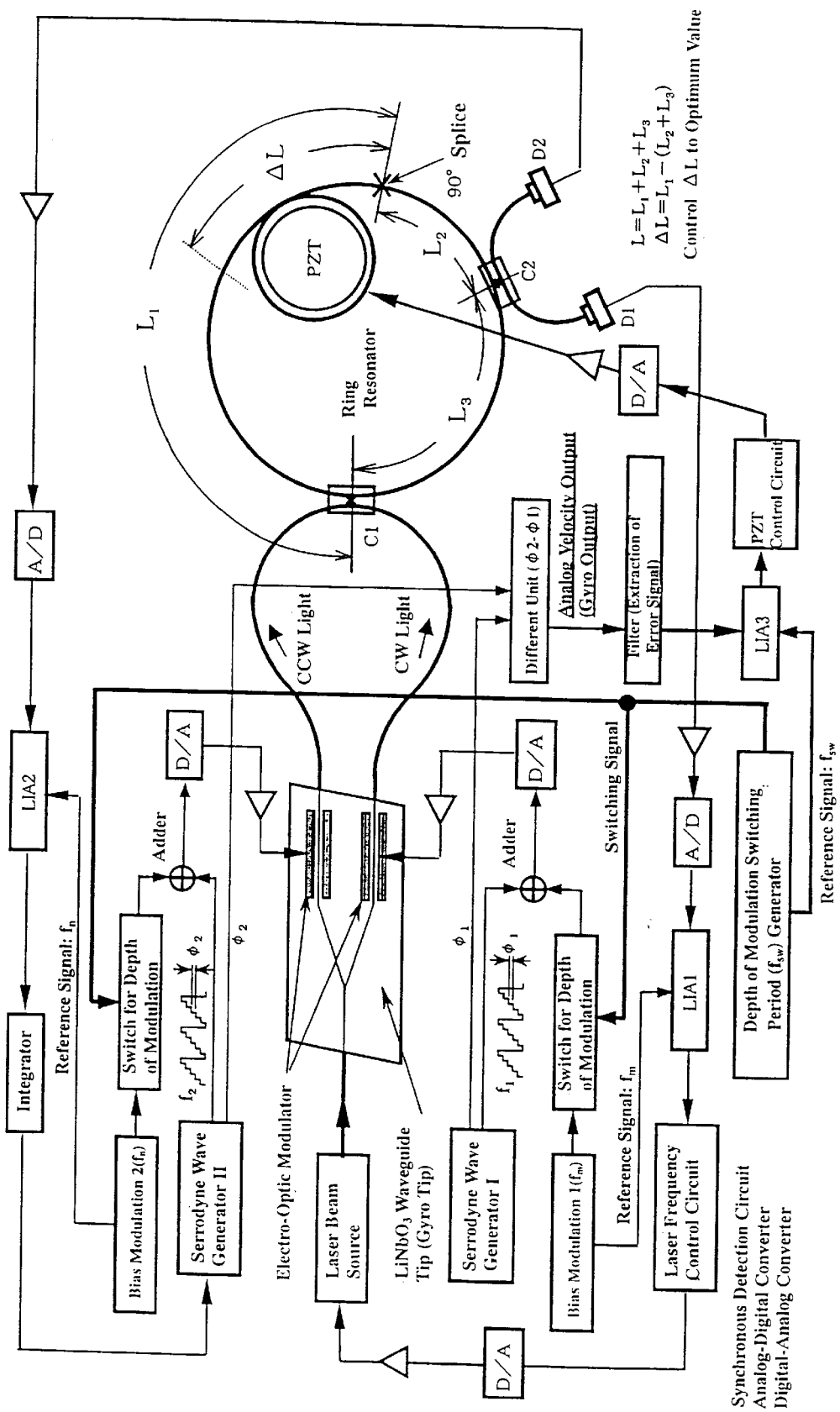
FIG. 23 is a block diagram (transmitter type) of R-FOG applying the control of $\Delta\beta\Delta L$.

FIG. 23 shows a forth embodiment of the resonator fiber optic gyro with the method in accordance with the present invention applied thereto. The configuration of the R-FOG using the transmitter ring resonator having the 90° splice is shown in the figure.

In measuring the non-reciprocal effect of the rotation, etc., a fiber is coiled around a columnar PZT (piezoelectric element) to control the length so that the difference $\Delta L$ between the lengths $L_1$ from the input side coupler (C1) to the 90° splice point, and the length ($L_2+L_3$) from the 90° splice point to the input side coupler (C1) via the output side coupler (C2) is optimized to reduce the error, where $L_1$, $L_2$ and L3 are the lengths of three portions of the waveguide (the optical fiber) to be divided by the input side coupler (C1) (the first coupler) in which the light wave emitted from the laser beam source reaches first, the 90° splice point in the ring resonator, and the output side coupler (C2) (the second coupler) to emit the light wave and input it in the light receiver.

The signal processing method is similar to that when using the reflector ring resonator (FIG. 22).

As described above, in the present invention, the ring resonator itself can be set in a condition in which no error is generated even when the polarization dependency loss is present in the ring resonator.

Thus, the resonator fiber optic gyro using the method in accordance with the present invention can minimize the error in the gyro output induced by the polarization fluctuation, and reduce the drift of the gyro output caused by the error fluctuation. A gyro with high accuracy can be realized thereby.

What is claimed is:

1. A method of reducing the polarization fluctuation inducing drift in a resonator fiber optic gyro, comprising the step of:

setting $\Delta L$ so that the relationship of $\Delta L$ and $\Delta \beta$ satisfies a formula $\Delta \beta \Delta L = \pi + 2n\pi$ [radian] (n: integer), or approximately satisfies the formula to minimize the error induced by the polarization fluctuation where $\Delta L$ is the difference in length between $L_1$ and $L_2$ of two portions of a waveguide divided by a coupler and the polarization-rotating point, and $\Delta \beta$ is the difference in propagation constant of two axes of polarization of the waveguide in a method of measuring the non-reciprocal effect such as the rotation in a reflector ring resonator comprising a sensing loop formed of the waveguide having two axes of polarization to propagate the light wave, and the coupler which is inserted in said sensing loop, guides the light wave from a laser beam source to said sensing loop and emits the light wave in said sensing loop, and having a polarization-rotating point in said sensing loop.

2. A method of reducing the polarization fluctuation inducing drift in a resonator fiber optic gyro, comprising the step of:

setting $\Delta L$ and $L_3$ so that the relationship of $\Delta L$, $\Delta \beta$ and $L_3$ satisfies a formula $\Delta \beta \Delta L = \pi + 2n\pi$ [radian] (n: integer) and $\Delta \beta L_3 = m\pi$ [radian] (m: integer), or approximately satisfies the formulae to minimize the error induced by the polarization fluctuation where $L_1$ is the distance from said first coupler to the polarization-rotating point, $L_2$ is the distance from the polarization-rotating point to said second coupler, $L_3$ is the distance from said second coupler to said first coupler, $\Delta L$ is the difference between $L_1$ and the length $(L_2+L_3)$ from the polarization-rotating point to said first coupler through said second coupler, and $\Delta \beta$ is the difference in propagation constant of two axes of polarization of the waveguide when the waveguide is divided into three portions by said first coupler, said polarization-rotating point and said second coupler in a method of measuring the non-reciprocal effect such as the rotation in a transmitter ring resonator comprising a sensing loop formed of the waveguide having two axes of polarization to propagate the light wave, a first coupler to guide the light wave from a laser beam source to said sensing loop and a second coupler to emit the light wave in said sensing loop which are inserted in said sensing loop, and having a polarization-rotating point in said sensing loop.

3. A method of reducing the polarization fluctuation inducing drift in a resonator fiber optic gyro as claimed in claim 1, wherein a polarization-rotating angle at a polarization-rotating point is approximately 90°.

4. A method of reducing the polarization fluctuation inducing drift in a resonator fiber optic gyro, comprising the step of:

minimizing the error irrespective of any change in $\Delta \beta L$ by controlling $\Delta L$ making use of the fact that the characteristic of said measurement error is considerably dependent on the product of $\Delta \beta$ and $\Delta L$ where $\Delta L$ is the difference in length of two portions of a waveguide divided by said first coupler and said polarization-rotating point, and $\Delta \beta$ is the difference in propagation constant of two axes of polarization of the waveguide, and less dependent on $\Delta \beta L$ which is the product of the sum of the length of two portions of the waveguide (L) and $\Delta \beta$ which is the sum in propagation constant of two axes of polarization of the waveguide in a method of measuring the non-reciprocal effect such as the rotation in a reflector ring resonator or a transmitter ring resonator comprising a sensing loop formed of the waveguide having two axes of polarization to propagate the light wave and a coupler inserted in said sensing loop, and having a polarization-rotating point in said sensing loop.

5. A method of reducing the polarization fluctuation inducing drift in a resonator fiber optic gyro as claimed in claim 4, wherein the error is minimized irrespective of any change in $\Delta \beta L$ through the feedback to the difference $\Delta L$ in length between two portions of a waveguide divided by a coupler in which the light wave emitted from a laser beam source reaches first and the polarization-rotating point in a ring resonator making use of generation of an error signal indicating the deviation from an optimum value of $\Delta \beta \Delta L$ at a predetermined period by alternately applying two different depths of modulation in the bias modulation implemented for detecting a resonance point at the predetermined period.

* * * * *